United States Patent
Ryu et al.

(10) Patent No.: US 11,800,463 B2
(45) Date of Patent: Oct. 24, 2023

(54) ENHANCED AUTOMATIC GAIN CONTROL FOR SIDELINK COMMUNICATION

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Fairless Hills, PA (US); Haim Weissman, Haifa (IL); Hua Wang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/559,271

(22) Filed: Dec. 22, 2021

(65) Prior Publication Data
US 2023/0199675 A1    Jun. 22, 2023

(51) Int. Cl.
*H04W 52/52* (2009.01)
*H04L 27/26* (2006.01)
(Continued)

(52) U.S. Cl.
CPC ......... *H04W 52/52* (2013.01); *H04L 27/2605* (2013.01); *H04L 27/26025* (2021.01); *H04W 24/08* (2013.01); *H04W 92/18* (2013.01)

(58) Field of Classification Search
None
See application file for complete search history.

(56) References Cited

U.S. PATENT DOCUMENTS

| | | |
|---|---|---|
| 2020/0359375 A1 | 11/2020 | Hwang et al. |
| 2021/0112505 A1 | 4/2021 | Li et al. |

(Continued)

FOREIGN PATENT DOCUMENTS

| | | |
|---|---|---|
| CN | 112118630 A | 12/2020 |
| WO | WO-2020088054 A1 | 5/2020 |
| WO | WO-2023275279 A1 * | 1/2023 |

OTHER PUBLICATIONS

CATT: "Support of Discontinuous Transmission for LAA", 3GPP TSG RAN WG1 Ad-hoc Meeting, R1-151005, 3rd Generation Partnership Project, Mobile Competence Centre, 650, Route Des Lucioles, F-06921 Sophia-Antipolis Cedex, France, vol. RAN WG1, No. Paris, France, Mar. 24, 2015-Mar. 26, 2015, Mar. 18, 2015, XP050951383, 4 Pages, Retrieved on Mar. 18, 2015, Section 2.2.

(Continued)

*Primary Examiner* — Anh Vu H Ly
(74) *Attorney, Agent, or Firm* — Holland & Hart LLP

(57) ABSTRACT

Methods, systems, and devices for wireless communications are described. In some examples, a sidelink user equipment (UE) may monitor a set of symbols over a wireless channel. The set of symbols may include at least a first subset of symbols and a second subset of symbols. A quantity of symbols included in the first subset of symbols may be based on a carrier frequency of the wireless channel, a symbol length of the wireless channel, a subcarrier spacing (SCS) of the wireless channel or a capability of the sidelink UE. Further, the sidelink UE may receive a sidelink transmission over the second subset of symbols, where a starting position of the second subset of symbols is defined according to the quantity of symbols included in the first subset of symbols

30 Claims, 12 Drawing Sheets

(51) Int. Cl.
*H04W 24/08* (2009.01)
*H04W 92/18* (2009.01)

(56) References Cited

U.S. PATENT DOCUMENTS

| | | | |
|---|---|---|---|
| 2021/0203455 A1* | 7/2021 | Zhang | H04L 1/1854 |
| 2021/0360624 A1* | 11/2021 | Zhang | H04W 72/56 |
| 2021/0400632 A1* | 12/2021 | Yang | H04W 72/20 |
| 2022/0022216 A1* | 1/2022 | Li | H04W 72/1263 |
| 2022/0061005 A1* | 2/2022 | Ko | H04L 5/005 |
| 2022/0303982 A1* | 9/2022 | Hosseini | H04W 28/26 |
| 2022/0407645 A1* | 12/2022 | Wang | H04W 72/20 |
| 2023/0007969 A1* | 1/2023 | Wang | H04W 72/12 |
| 2023/0028000 A1* | 1/2023 | Si | H04W 72/0453 |
| 2023/0067706 A1* | 3/2023 | Liu | H04L 1/16 |

OTHER PUBLICATIONS

International Search Report and Written Opinion—PCT/US2022/079393—ISA/EPO—dated Feb. 16, 2023 (2200611WO).
Qualcomm Incorporated: "D2D Rx on FDD Bands: RMC for Receiver Characteristics", 3GPP TSG-RAN WG4 #72bis, R4-146785, 3rd Generation Partnership Project, Mobile Competence Centre, 650, Route Des Lucioles, F-06921 Sophia-Antipolis Cedex, France vol. RAN WG4, No. Singapore, Oct. 6, 2014-Oct. 10, 2014, Oct. 12, 2014, XP050887533, 9 Pages, Retrieved on Oct. 12, 2014, Section 3.

* cited by examiner

Control Information 210

Sidelink Transmission 215

ENHANCED AUTOMATIC GAIN CONTROL FOR SIDELINK COMMUNICATION

FIELD OF TECHNOLOGY

The following relates to wireless communications, including enhanced automatic gain control (AGC) for sidelink communication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a wireless communications system may support sidelink communication. The first symbol of a sidelink slot may be allocated for automatic gain control (AGC). Using AGC, a receiving sidelink UE may adjust a receiver gain such that data signals received from other sidelink UEs fall with a range of an analog-to-digital converter (ADC) located at the receiver.

SUMMARY

The described techniques relate to improved methods, systems, devices, and apparatuses that support enhanced automatic gain control (AGC) for sidelink communication. Generally, the described techniques provide for adjusting or increasing a number of symbols allocated for AGC in a sidelink slot. In some examples, the number of AGC symbols may be adjusted or increased based on one or more characteristics of a sidelink UE. The one or more characteristics may include a carrier frequency associated with the sidelink UE, an SCS associated with the sidelink UE, or a capability of the sidelink UE. If the one or more characteristics satisfy a condition or exceed a threshold, the number of symbols allocated for AGC may be increased from one symbol to two or more symbols. This additional time may allow a sidelink UE to accurately complete AGC processing at higher frequency ranges (e.g., FR2-1 and FR2-2) associated with shorter symbol durations.

A method for wireless communication at a first UE is described. The method may include monitoring a set of multiple symbols over a wireless channel, the set of multiple symbols including at least a first subset of the set of multiple symbols and a second subset of the set of multiple symbols, where the first subset of the set of multiple symbols includes a quantity of symbols, and where the quantity of symbols is based on one or more of a carrier frequency of the wireless channel, a symbol length of the wireless channel, a subcarrier spacing (SCS) of the wireless channel, or a capability of the first UE and receiving a sidelink transmission over the second subset of the set of multiple symbols in accordance with the monitoring, where a starting position of the second subset of the set of multiple symbols is based on the quantity of symbols including the first subset of the set of multiple symbols.

An apparatus for wireless communication at a first UE is described. The apparatus may include a processor, memory coupled with the processor, and instructions stored in the memory. The instructions may be executable by the processor to cause the apparatus to monitor a set of multiple symbols over a wireless channel, the set of multiple symbols including at least a first subset of the set of multiple symbols and a second subset of the set of multiple symbols, where the first subset of the set of multiple symbols includes a quantity of symbols, and where the quantity of symbols is based on one or more of a carrier frequency of the wireless channel, a symbol length of the wireless channel, a SCS of the wireless channel, or a capability of the first UE and receive a sidelink transmission over the second subset of the set of multiple symbols in accordance with the monitoring, where a starting position of the second subset of the set of multiple symbols is based on the quantity of symbols including the first subset of the set of multiple symbols.

Another apparatus for wireless communication at a first UE is described. The apparatus may include means for monitoring a set of multiple symbols over a wireless channel, the set of multiple symbols including at least a first subset of the set of multiple symbols and a second subset of the set of multiple symbols, where the first subset of the set of multiple symbols includes a quantity of symbols, where the quantity of symbols is based on one or more of a carrier frequency of the wireless channel, a symbol length of the wireless channel, a SCS of the wireless channel, or a capability of the first UE and means for receiving a sidelink transmission over the second subset of the set of multiple symbols in accordance with the monitoring, where a starting position of the second subset of the set of multiple symbols is based on the quantity of symbols including the first subset of the set of multiple symbols.

A non-transitory computer-readable medium storing code for wireless communication at a first UE is described. The code may include instructions executable by a processor to monitor a set of multiple symbols over a wireless channel, the set of multiple symbols including at least a first subset of the set of multiple symbols and a second subset of the set of multiple symbols, where the first subset of the set of multiple symbols includes a quantity of symbols, and where the quantity of symbols is based on one or more of a carrier frequency of the wireless channel, a symbol length of the wireless channel, a SCS of the wireless channel, or a capability of the first UE and receive a sidelink transmission over the second subset of the set of multiple symbols in accordance with the monitoring, where a starting position of the second subset of the set of multiple symbols is based on the quantity of symbols including the first subset of the set of multiple symbols.

In some examples of the method, apparatuses, and non-transitory computer-readable medium described herein, the first subset of the set of multiple symbols includes a repetition of a symbol of the second subset of the set of multiple symbols.

In some examples of the method, apparatuses, and non-transitory computer-readable medium described herein, the first subset of the plurality of symbols includes a starting symbol or an ending symbol of the second subset of the set of multiple symbols.

In some examples of the method, apparatuses, and non-transitory computer-readable medium described herein, all of the symbols in the first subset of the set of multiple symbols may be duplicates of one another.

In some examples of the method, apparatuses, and non-transitory computer-readable medium described herein, the quantity of symbols including the first subset of the set of multiple symbols may be greater than or equal to two symbols when the carrier frequency exceeds a threshold.

In some examples of the method, apparatuses, and non-transitory computer-readable medium described herein, the quantity of symbols including the first subset of the set of multiple symbols may be greater than or equal to two symbols when the SCS exceeds a threshold.

In some examples of the method, apparatuses, and non-transitory computer-readable medium described herein, the set of multiple symbols further includes a third subset of the set of multiple symbols and at least a portion of resources including the third subset of the set of multiple symbols may be allocated for reference signal transmissions.

In some examples of the method, apparatuses, and non-transitory computer-readable medium described herein, the first subset of the set of multiple symbols includes a repetition of a symbol of the third subset of the set of multiple symbols.

Some examples of the method, apparatuses, and non-transitory computer-readable medium described herein may further include operations, features, means, or instructions for identifying a respective scrambling seed for each respective symbol of the first subset of the set of multiple symbols, where the respective scrambling seed may be based on an index corresponding to the respective symbol.

Some examples of the method, apparatuses, and non-transitory computer-readable medium described herein may further include operations, features, means, or instructions for identifying a same scrambling seed for each respective symbol of the first subset of the set of multiple symbols.

In some examples of the method, apparatuses, and non-transitory computer-readable medium described herein, the second subset of the set of multiple symbols includes resources allocated for one or more of a physical sidelink shared channel (PSSCH), a physical sidelink control channel (PSCCH), or a physical sidelink feedback channel (PSFCH).

Some examples of the method, apparatuses, and non-transitory computer-readable medium described herein may further include operations, features, means, or instructions for estimating an amount of energy of a signal received over the first subset of the plurality of symbols based on monitoring the first subset of the plurality of symbols and adjusting a receiver gain for receiving the sidelink transmission based on estimating the amount of energy.

A method for wireless communication at a second UE is described. The method may include receiving an indication of a set of multiple symbols for sidelink transmissions over a wireless channel, the set of multiple symbols including at least a first subset of the set of multiple symbols and a second subset of the set of multiple symbols, where the first subset of the set of multiple symbols includes a quantity of symbols, and where the quantity of symbols is based on one or more of a carrier frequency of the wireless channel, a symbol length of the wireless channel, a SCS of the wireless channel, or a capability of a first UE and transmitting, to the first UE, a sidelink transmission over the second subset of the set of multiple symbols, where a starting point of the second subset of the set of multiple symbols is based on the quantity of symbols including the first subset of the set of multiple symbols.

An apparatus for wireless communication at a second UE is described. The apparatus may include a processor, memory coupled with the processor, and instructions stored in the memory. The instructions may be executable by the processor to cause the apparatus to receive an indication of a set of multiple symbols for sidelink transmissions over a wireless channel, the set of multiple symbols including at least a first subset of the set of multiple symbols and a second subset of the set of multiple symbols, where the first subset of the set of multiple symbols includes a quantity of symbols, and where the quantity of symbols is based on one or more of a carrier frequency of the wireless channel, a symbol length of the wireless channel, a SCS of the wireless channel, or a capability of a first UE and transmit, to the first UE, a sidelink transmission over the second subset of the set of multiple symbols, where a starting point of the second subset of the set of multiple symbols is based on the quantity of symbols including the first subset of the set of multiple symbols.

Another apparatus for wireless communication at a second UE is described. The apparatus may include means for receiving an indication of a set of multiple symbols for sidelink transmissions over a wireless channel, the set of multiple symbols including at least a first subset of the set of multiple symbols and a second subset of the set of multiple symbols, where the first subset of the set of multiple symbols includes a quantity of symbols, and where the quantity of symbols is based on one or more of a carrier frequency of the wireless channel, a symbol length of the wireless channel, a SCS of the wireless channel, or a capability of a first UE and means for transmitting, to the first UE, a sidelink transmission over the second subset of the set of multiple symbols, where a starting point of the second subset of the set of multiple symbols is based on the quantity of symbols including the first subset of the set of multiple symbols.

A non-transitory computer-readable medium storing code for wireless communication at a second UE is described. The code may include instructions executable by a processor to receive an indication of a set of multiple symbols for sidelink transmissions over a wireless channel, the set of multiple symbols including at least a first subset of the set of multiple symbols and a second subset of the set of multiple symbols, where the first subset of the set of multiple symbols includes a quantity of symbols, and wherein the quantity of symbols is based on one or more of a carrier frequency of the wireless channel, a symbol length of the wireless channel, a SCS of the wireless channel, or a capability of a first UE and transmit, to the first UE, a sidelink transmission over the second subset of the set of multiple symbols, where a starting point of the second subset of the set of multiple symbols is based on the quantity of symbols including the first subset of the set of multiple symbols.

In some examples of the method, apparatuses, and non-transitory computer-readable medium described herein, the first subset of the set of multiple symbols includes a repetition of a symbol of the second subset of the set of multiple symbols.

In some examples of the method, apparatuses, and non-transitory computer-readable medium described herein, the first subset of the plurality of symbols includes a starting symbol or an ending symbol of the second subset of the set of multiple symbols.

In some examples of the method, apparatuses, and non-transitory computer-readable medium described herein, all of the symbols in the first subset of the set of multiple symbols may be duplicates of one another.

In some examples of the method, apparatuses, and non-transitory computer-readable medium described herein, the quantity of symbols including the first subset of the set of multiple symbols may be greater than or equal to two symbols when the carrier frequency exceeds a threshold.

In some examples of the method, apparatuses, and non-transitory computer-readable medium described herein, the quantity of symbols including the first subset of the set of multiple symbols may be greater than or equal to two symbols when the SCS exceeds a threshold.

Some examples of the method, apparatuses, and non-transitory computer-readable medium described herein may further include operations, features, means, or instructions for receiving, from a base station, an indication of the capability of the first UE, where identifying the set of multiple symbols may be based on receiving the indication of the capability of the first UE.

In some examples of the method, apparatuses, and non-transitory computer-readable medium described herein, the set of multiple symbols further includes a third subset of the set of multiple symbols and at least a portion of resources including the third subset of the set of multiple symbols may be allocated for reference signal transmissions.

In some examples of the method, apparatuses, and non-transitory computer-readable medium described herein, the first subset of the set of multiple symbols includes a repetition of a symbol of the third subset of the set of multiple symbols.

Some examples of the method, apparatuses, and non-transitory computer-readable medium described herein may further include operations, features, means, or instructions for generating a respective scrambling seed for each respective symbol of the first subset of the set of multiple symbols, where the respective scrambling seed may be based on an index corresponding to the respective symbol.

Some examples of the method, apparatuses, and non-transitory computer-readable medium described herein may further include operations, features, means, or instructions for generating a same scrambling seed for each respective symbol of the first subset of the set of multiple symbols.

In some examples of the method, apparatuses, and non-transitory computer-readable medium described herein, the second subset of the set of multiple symbols includes resources allocated for one or more of a PSSCH, a PSCCH, or a PSFCH.

DETAILED DESCRIPTION

A wireless communications system may support sidelink communication. Sidelink communication may be described as communication between two user equipment (UEs). A slot marked for sidelink may include multiple symbols. A first symbol of the slot may be a duplicate of a symbol included in a physical sidelink shared channel (PSSCH) or a physical sidelink control channel (PSCCH) resource allocation following the first symbol and in some cases, may be used for automatic gain control (AGC). AGC allows a UE to change the gain of a received signal such that the signal falls within a range of an analog to digital converter (ADC). In some examples, the UE may operate in a higher frequency range (e.g., FR2-1 or FR2-2) with a higher subcarrier spacing (SCS) (e.g., 120 kilohertz (kHz)). Operating at the higher frequency range may result in shorter symbol durations. As such, a UE operating in the higher frequency range may be unable to complete AGC using the single AGC symbol. That is, the UE may be unable to adjust the gain of a received signal or incorrectly adjust the gain of the received signal.

In some examples, sidelink UEs may adjust or increase the number of symbols allocated for AGC. In one example, a sidelink UE may set the number of symbols allocated for AGC to two or more symbols based on a carrier frequency or an SCS of the sidelink UE exceeding a threshold. Additionally or alternatively, the number of symbols allocated for AGC may be determined based on a capability of the sidelink UE (e.g., a receiving sidelink UE). The symbols allocated for AGC may include duplicates of one or more symbols included in the PSSCH or PSCCH resource allocation of the slot. Alternatively, the symbols allocated for AGC may include a duplicate of one or more symbols included in a reference signal resource allocation of the slot. Using the techniques as described herein may allow a sidelink UE to allocate more than one symbol for AGC in situations where the sidelink UE is operating at the higher frequency range which may allow the sidelink UE more time to perform AGC.

Aspects of the disclosure are initially described in the context of wireless communications systems. Additional aspects of the disclosure may be described in the context of a sidelink slot structure and a process flow. Aspects of the disclosure are further illustrated by and described with reference to apparatus diagrams, system diagrams, and flowcharts that relate to enhanced AGC for sidelink communication.

Figure 1:
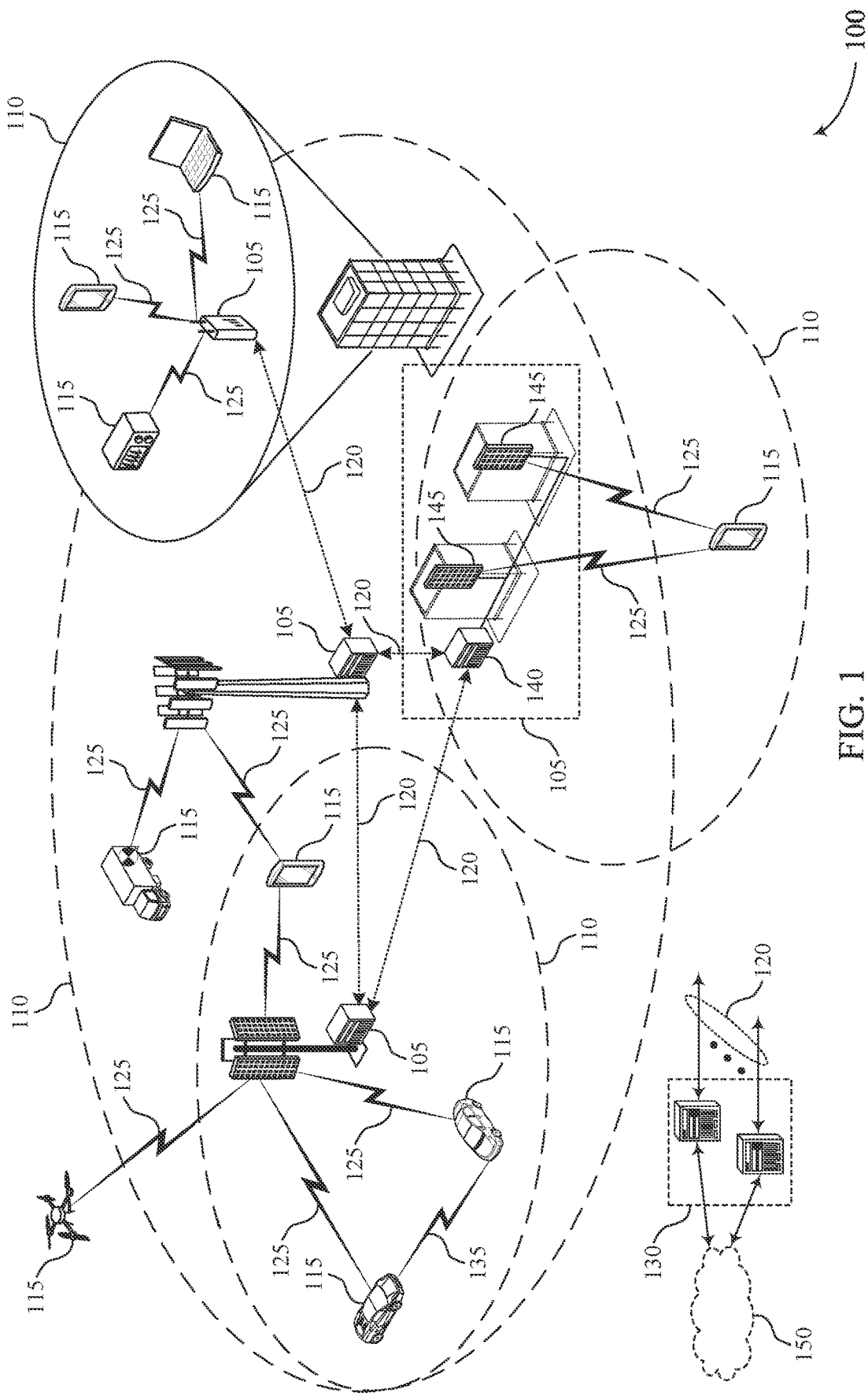
FIGS. 1 and 2 illustrate examples of a wireless communications system that supports enhanced automatic gain control (AGC) for sidelink communication in accordance with aspects of the present disclosure.

FIG. 1 illustrates an example of a wireless communications system 100 that supports enhanced AGC for sidelink communication in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and SCS are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a SCS ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW)

communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As described herein, a number of symbols allocated for AGC in a sidelink slot may be adjusted or increased. In some examples, the number of AGC symbols may be adjusted or increased based on one or more characteristics of a sidelink UE 115. The one or more characteristics may include a carrier frequency associated with the sidelink UE 115, an SCS associated with the sidelink UE 115, or a capability of the sidelink UE 115. If one or more characteristics satisfy a condition or exceed a threshold, the number of symbols allocated for AGC may be increased from one symbol to two or more symbols. As an example, the symbols allocated for AGC may be set to two symbols or greater than two symbols if the carrier frequency exceeds a threshold. This additional time may allow a sidelink UE 115 to accurately complete AGC processing at higher frequency ranges (e.g., FR2-1 and FR2-1) associated with shorter symbol durations.

Figure 2:
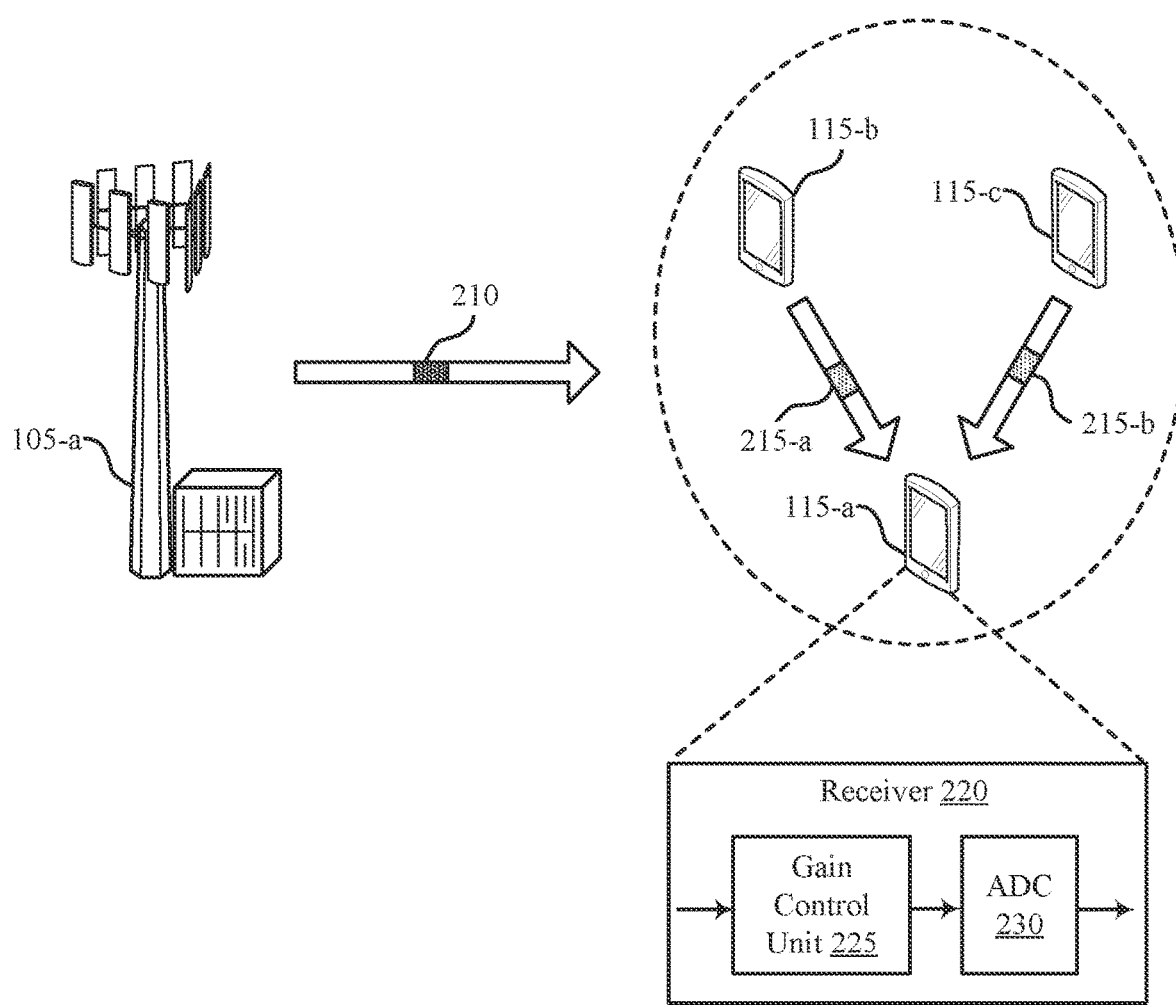
Figure 2:
Figure 2:

FIG. 2 illustrates an example of a wireless communications system 200 that supports enhanced AGC for sidelink communication in accordance with aspects of the present disclosure. The wireless communications system 200 may include a base station 105-a, a UE 115-a, a UE 115-b, and a UE 115-c. In some examples, the wireless communications system 200 may implement aspects of a wireless communications system 100. For example, the base station 105-a may be an example of a base station 105 as described with reference to FIG. 1. Moreover, the UE 115-a, the UE 115-b, and the UE 115-c may be examples of UEs 115 as described with reference to FIG. 1.

In some examples, the wireless communications system 200 may support sidelink communication. Sidelink communication may be described as communication between two or more wireless devices (e.g., two or more UEs 115). Before UEs 115 may communicate via sidelink, the UEs 115 may receive control information 210 from the base station 105-a. The control information 210 may include an indication of a set of sidelink resources that the UEs 115 may utilize to communicate with one another. From the set of sidelink resources, the UEs 115 may select time and frequency resources on which to transmit sidelink signals. The UEs 115 may select the time and frequency resources using one of two possible modes.

In a first mode, the base station 105-a may schedule sidelink communication. That is, a UE 115 may receive a sidelink grant from the base station 105-a indicating the time and frequency resources on which the UE 115 may transmit a signal to another UE 115. In a second mode, the UE 115 may autonomously schedule sidelink communications without the sidelink grant from the base station 105-a. The UE 115 may decode sidelink control information (SCI) from other UEs 115 and select time and frequency resources based on the decoded SCI.

The set of sidelink resources allocated to the UEs 115 for sidelink communication may make up one or more sidelink slots. A sidelink slot may include a set of symbols (e.g., 14 OFDM symbols defined by sl-LengthSymbols-r16), where different subsets of the set of symbols may be allocated for different operations or types of transmissions. For example, a subset of the set of symbols may be allocated for one of AGC, PSSCH transmissions, PSCCH transmissions, uplink transmissions, downlink transmissions, or physical sidelink feedback channel (PSFCH) transmissions. Using other methods, a starting position of the symbols allocated for PSSCH transmissions may be defined as a first symbol of the sidelink slot plus one symbol (sl-StartSymbol-r16+1). As such, the symbols allocated for PSSCH transmissions may begin at a second symbol of the sidelink slot and may include five to twelve symbols. PSCCH transmissions may be FDM'd with PSSCH transmissions and as such, a portion of the symbols allocated for PSSCH transmissions (e.g., two or three symbols) may also be allocated for PSCCH transmissions. The remaining symbols (e.g., symbols after the symbols allocated for PSSCH transmissions and PSCCH transmissions) may be gap symbols or allocated for PSFCH transmissions, uplink transmissions, or downlink transmissions. In some examples, two symbols of the sidelink slot may be allocated for PSFCH transmission and a gap symbol be situated on either side of the two symbols.

In some examples, the UE 115-a may be a receiving UE and the UE 115-b and the UE 115-c may be example of transmitting UEs. In such example, the UE 115-a may receive sidelink transmissions 215 from the UE 115-b and the UE 115-c. In order to receive and decode sidelink transmissions 215 from the UE 115-b and the UE 115-c, a receiver 220 at the UE 115-a may include a gain control unit 225 and an ADC 230. The function of an ADC 230 may be to transform analog signals into a digital form such that the information may be read and processed by the UE 115-a. In some examples, the ADC 230 may have an associated range, where the associated range specifies the maximum and minimum voltage that may be input into the ADC 230. In order for the ADC 230 to function properly, the received sidelink signal may be within the range of the ADC 230.

In some examples, a UE 115 may receive multiple sidelink signals. For example, the UE 115-a may receive a sidelink transmission 215-a from the UE 115-b and a sidelink transmission 215-b from the UE 115-c. At the UE 115-a, the sidelink transmission 215-a and the sidelink transmission 215-b may be combined and the combined signal may be above the range of the ADC 230. In such case, overflow can occur at the ADC 230 and the ADC 230 may not accurately convert the combined analog signal into a digital representation of the signal. Similar effects may occur if the combined signal is below the range of the ADC 230 (e.g., underflow). To combat the presence of overflow or underflow, the UE 115-a may implement a gain control unit 225.

The UE 115-a may monitor a symbol of the sidelink slot for sidelink transmissions 215 from the UE 115-b and the UE 115-c and determine an amount to adjust a gain of the UE 115-a (e.g., receiver gain) such that future transmissions (e.g., PSSCH transmissions, PSCCH transmissions, or PSFCH transmission) may fall within the range of the ADC 230. The symbols over which the UE 115-a monitors for the sidelink transmissions 215 for the purpose of gain adjustment may be known as an AGC symbol. In some examples, the first symbol of the sidelink slot (e.g., the symbol that comes before the symbols allocated for PSSCH transmissions) may be the AGC symbol for PSSCH transmissions and the AGC symbol may be a replication of the first symbol allocated for PSSCH transmissions (e.g., second symbol in the sidelink slot). Additionally, the first symbol of the symbols allocated for PSFCH may be the AGC symbol for PSFCH transmissions and the AGC symbol may be a replication of the second symbol allocated for PSFCH transmissions. In either case, a single symbol may be used for AGC.

However, in some examples, the UE 115 may operate in high frequency ranges. For example, the UE 115 may operate in FR2 which may include a frequency range of 24.25 GHz to 52.6 GHz. At the higher frequency range, the SCS (SCS) may increase (e.g., to 120 kHz) and a duration of the symbols may decrease (e.g., to 9 μsec) when compared to a lower frequency range (e.g., FR1). Because the symbol duration is relatively short, the UE 115 may be unable to perform AGC. Specifically, the UE 115 may not have enough time to process the sidelink transmissions 215 and estimate wideband energy estimate (WBEE) which may be a crucial part of AGC. WBEE is a calculation of how much power is received by the receiver (e.g., the UE 115-a) and is calculated based on the accumulated received signal samples and gain is adjusted based on the estimate of WBEE.

As described herein, the UE 115 may increase or adjust a number of symbols allocated for AGC in the sidelink slot. In some examples, a receiving UE 115 (e.g., a UE 115-a) and a transmitting UE 115 (e.g., the UE 115-b or the UE 115-c) may identify a parameter (e.g., a parameter k) that indicates the number of symbols allocated for AGC. The parameter may be based on a carrier frequency on which the receiving UE 115 operates, an SCS defined for the receiving UE 115, or a capability of the receiving UE 115. As one example, the parameter may be equal to two or a value greater than two if the SCS is above a threshold (e.g., above 120 kHz). As another example, the parameter may be equal to two or a value greater than two if the carrier frequency is above a threshold (e.g., above 24.25 GHz).

The parameter may additionally or alternatively define a starting position of the symbols allocated for PSSCH transmissions. For example, the starting position of the symbols allocated for PSSCH transmission may be a first symbol of the sidelink slot plus the parameter. As one example, the parameters may be two. In such case, the symbols allocated for PSSCH transmission may being at the third symbol of the sidelink slot. Additionally or alternatively, the parameters may define a number of symbols allocated for PSFCH transmissions. For example, the number of symbols allocated for PSFCH transmission may be the parameter plus one. If the parameter is two, the total number of symbols allocated for PSFCH transmissions may be three symbols, where the first two symbols are AGC symbols and the last symbol is for PSFCH transmissions.

As described above, the UE 115 may operate according to a first mode or a second mode. In the first mode, the UEs 115 (e.g., the UE 115-a, the UE 115-c, and the UE 115-c) may determine the parameter using a capability of the receiving UE 115 (e.g., the UE 115-a). The UEs 115 may receive capability information via the control information 210 sent from the base station 105-a. If the receiving UE 115 is a low capability UE, the UEs 115 may set the value of the parameters to be two or more than two. Alternatively, if the receiving UE is a high capability UE, the UEs 115 may set the value of the parameters to be one. Because the base station 105-a schedules sidelink transmissions between pairs of UEs 115 in the first mode, the parameter may be different for different pairs dependent on the receiving UE 115 capability. Alternatively, in the second mode, the parameter may be fixed for all nearby UEs 115. UEs 115 operating in the second mode may need some knowledge on which resources to monitor for SCI from all nearby UEs 115. The resources allocated for SCI may be located after the symbols allocated for AGC and as such, differing parameters between UEs 115 may make it difficult for the UEs 115 to monitor for SCI from nearby UEs 115.

The methods as described herein may allow a UE 115 to allocate two or more symbols for AGC. If UE 115 adjusts the gain for reception of PSSCH transmissions, the two or more AGC symbols may be symbols located directly before the symbols allocated for the PSSCH transmissions in the sidelink slot. In some examples, the AGC symbols may be duplicates of one or more symbols of the sidelink slot. For example, the AGC symbols may be duplicates of the first symbol of the symbols allocated for PSSCH transmissions in the sidelink slot. As another example, the AGC symbols may be duplicates of different symbols of the sidelink slot. In such case, the UE 115 may identify a mapping between the AGC symbols and the symbols of the sidelink slot. Using the mapping, the UE 115 may determine which symbols of the sidelink slot will serve as duplicates for which AGC symbols.

As another example, the AGC symbols may not be duplicates of any of the symbols of the sidelink slot. Instead, the AGC symbols may be duplicates of one or more symbols allocated for reference signal transmissions. As one example, the AGC symbols may include symbols that are duplicates of a symbol allocated for reference signal transmissions with an identical scrambling seed. As another example, the AGC symbols may be symbols that are duplicates of different symbols allocated for reference signal transmissions with different scrambling seeds. In such example, the UE 115 may index the symbols allocated for the AGC relative to the start of the sidelink slot and identify a scrambling seed for an AGC symbol based on its index. That is, the UE 115 may be configured with a mapping between AGC symbol indices and scrambling seeds. Alternatively or additionally, the UE 115 may adjust the gain for reception of PSFCH transmissions. In such case, the two or more AGC symbols may occupy the first two or more symbols of the symbols allocated for PSFCH transmissions. The two or more AGC symbols may be symbols that are duplicates of the last symbol of the symbols allocated for PSFCH transmissions. The method as described herein may allow a UE 115 to allocated more than one symbol for AGC which may allow a UE 115 adequate time to perform AGC while operating at higher frequency range.

Figure 3:
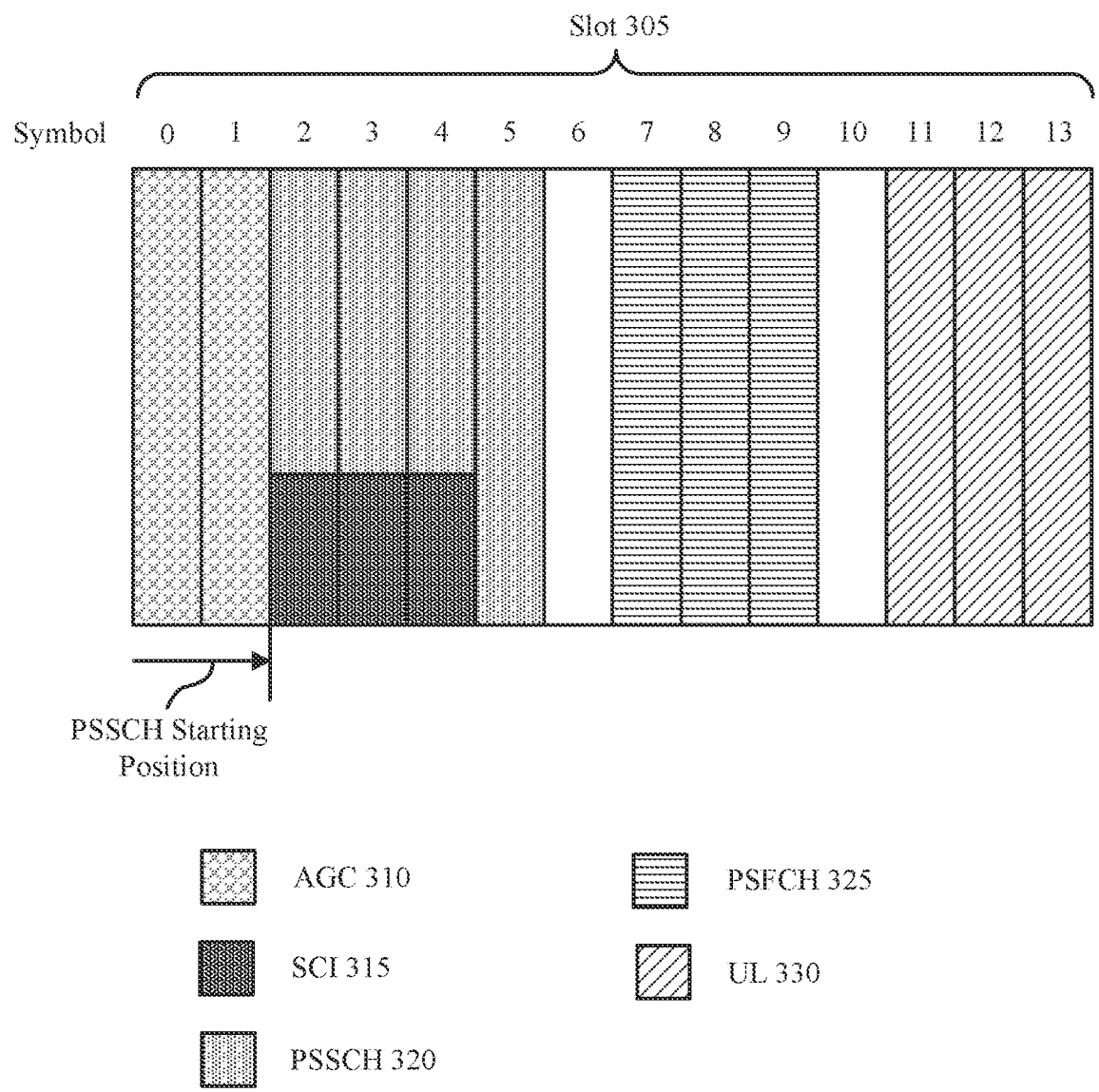
FIG. 3 illustrates an example of a sidelink slot structure that supports enhanced AGC for sidelink communication in accordance with aspects of the present disclosure.

FIG. 3 illustrates an example of a sidelink slot structure 300 that supports enhanced AGC for sidelink communication in accordance with aspects of the present disclosure. In some examples, the sidelink slot structure 300 may implement or be implemented by aspects of a wireless communications system 100 and a wireless communications system 200. For example, the sidelink slot structure 300 may implemented by a UE 115 as described with reference to FIG. 1.

In some examples, resources that a UE may utilize for sidelink communication may be included in one or more slots 305. Each slot 305 of the one or more slots 305 may be divided into a set of symbols. For example, as shown in FIG. 3, the slot 305 may be divided into fourteen symbols. The symbols of the slot 305 may be allocated for different types of transmissions or operations. For example, the symbols of the slot 305 may be allocated for AGC 310, SCI 315, PSSCH 320, PSFCH 325, or uplink 330. Although FIG. 3 shows the symbols of the slot 305 being allocated for AGC 310, SCI 315, PSSCH 320, PSFCH 325, and uplink 330, the symbols of the slot 305 may be allocated for some but not all of AGC 310, SCI 315, PSSCH 320, PSFCH 325, or uplink 330. For example, the slot 305 may not include the symbols allocated for PSFCH 325 and the symbols allocated for uplink 330 and instead, PSSCH 320 may occupy the corresponding symbols.

In one example, the UE may monitor the symbols allocated for AGC 310 in order to determine a gain adjustment for receiving PSSCH transmissions over the symbols allocated for PSSCH 320. A starting position of the symbols allocated for PSSCH may depend on a number of symbols allocated for AGC. For example, the starting position of the PSSCH may be defined as the starting symbol of the slot 305 plus a parameter, where the parameters represent the number of symbols allocated for AGC. The UE may determine the parameter using one or more of a carrier frequency over which a receiving sidelink UE is operating, an SCS configured for the sidelink receiving UE, or a capability of the sidelink receiving UE. As shown in FIG. 3, the UE may allocate two symbols to AGC 310 (e.g., symbols 0 and 1) or set the parameter to a value of two if the carrier frequency is above a threshold, if the SCS is above a threshold, or if the sidelink receiving UE is a low capability UE. In such example, the starting position of the PSSCH 320 may be symbol 2.

The symbols allocated for AGC 310 may be identical to one another or different from one another. In one example, the symbols allocated for AGC 310 may be duplicates of one or more symbols of the symbols allocated for PSSCH 320. For example, symbols 0 and 1 may be duplicates of symbol 2 or, as another example, symbol 0 may be a duplicate of symbol 2 and symbol 1 may be a duplicate of symbol 3. Alternatively, the symbols allocated for AGC may be duplicates of one or more symbols allocated for reference signals. The symbols allocated for reference signals may be included in the slot 305 or may be included in a slot different from the slot 305. As one example, the symbols 0 and 1 may be duplicates of a same symbol allocated for reference signals with a same scrambling seed or, as another example, the symbol 0 may be a duplicate of a first symbol allocated for reference signals with a first scrambling seed and the symbol 1 may be a duplicate of a second symbols allocated for reference signals with a second scrambling seed. In the case of different scrambling seeds, the UE may identify a mapping between scrambling seeds and AGC symbol indices and determine the scrambling seeds for the different symbols allocated for AGC 310 based on the mapping. As one example, the mapping may indicate a relationship between an index for symbol 0 and the first scrambling seed and a relationship between an index for the symbol 1 and the second scrambling seed.

Additionally, the UE may adjust the gain for receiving PSFCH transmissions over the symbols allocated for PSFCH 325. In such examples, a number of the symbols allocated for PSFCH 325 may be used for AGC 310. The UE may determine the number of symbols allocated for AGC 310 using one or more of a carrier frequency over which a receiving sidelink UE is operating, an SCS configured for the sidelink receiving UE, or a capability of the sidelink receiving UE. In the example of FIG. 3, the UE may allocate two symbols to AGC 310 (e.g., symbols 7 and 8) if the carrier frequency is above a threshold, if the SCS is above a threshold, or if the sidelink receiving UE is a low capability UE. The remaining symbol (e.g., the symbol 9) may be allocated for PSFCH transmissions. The total number of symbols allocated for PSFCH 325 may be the number of symbols allocated for AGC 310 plus a single symbol. In the example of FIG. 3, the total number of symbols allocated for PSFCH may be three symbols. The UE may monitor the symbol 7 and 8 and adjust the gain for receiving PSFCH transmission over the symbol 9. The symbols allocated for PSFCH that are used for AGC 310 may be identical to one another or different from one another. In one example, the symbols allocated for PSFCH that are used for AGC may be duplicates of the last symbol allocated for PSFCH (e.g., the symbol 9).

Figure 4:
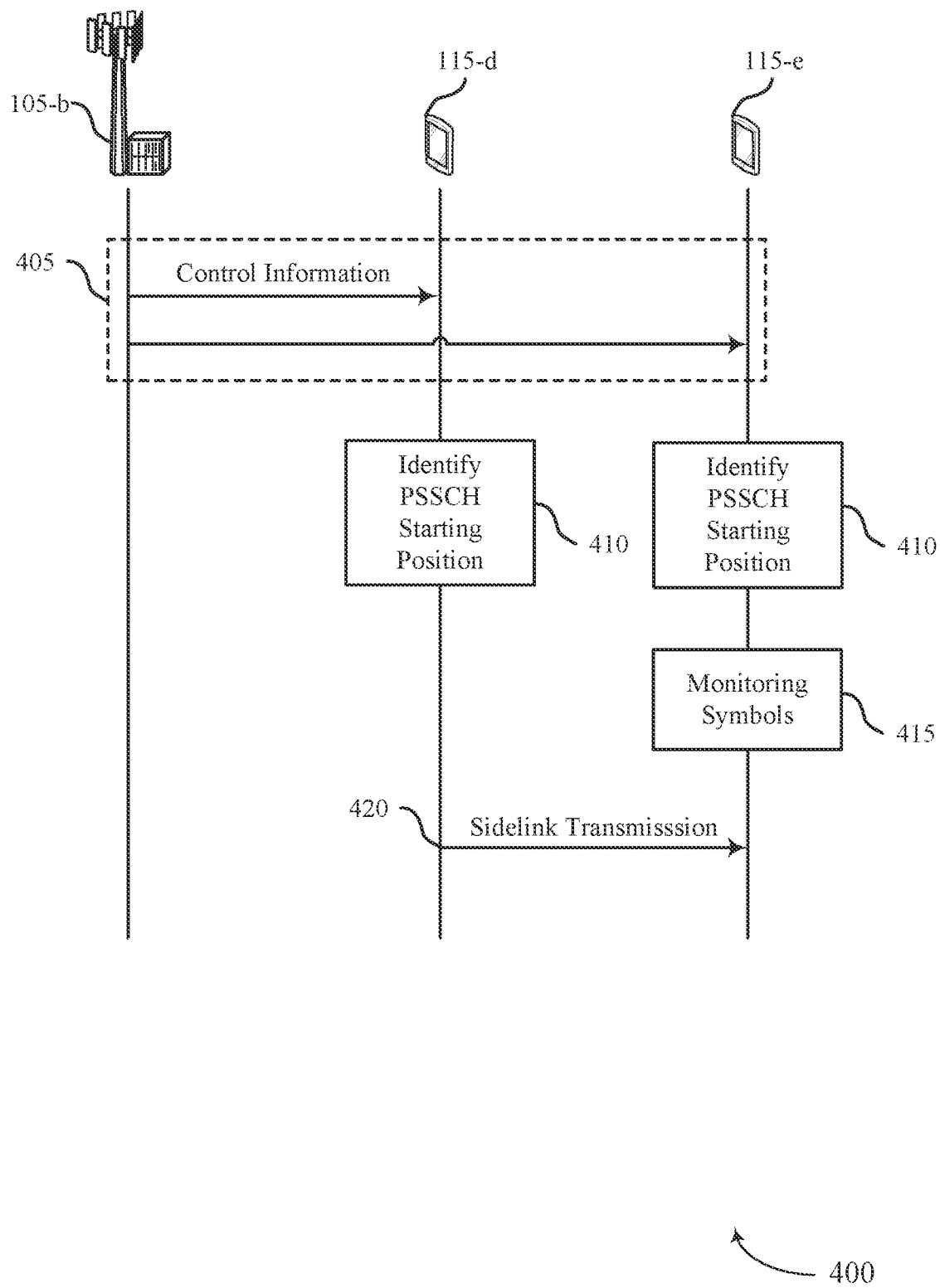
FIG. 4 illustrates an example of a process flow that supports enhanced AGC for sidelink communication in accordance with aspects of the present disclosure.

FIG. 4 illustrates an example of a process flow 400 that supports enhanced AGC for sidelink communication in accordance with aspects of the present disclosure. In some examples, the process flow 400 may implement or be implemented by aspects of a wireless communications system 100, a wireless communications system 200, or a sidelink slot structure 300. For example, the process flow 400 may be implemented by a UE 115 or a base station 105 as described with reference to FIGS. 1 and 2. Alternative examples of the following may be implemented, where some steps are performed in a different order then described or are not performed at all. In some cases, steps may include additional features not mentioned below, or further steps may be added.

At 405, the base station 105-b may transmit control information to the UE 115-d and the UE 115-e. In some examples, the control information may indicate a set of symbols over a wireless channel that the UE 115-d and the UE 115-e may utilize for sidelink communications. The set of symbols may include at least a first subset of symbols and a second subset of symbols. In some examples, the first subset of symbols may be allocated for AGC and the second subset of symbols may be allocated for PSSCH transmissions or PSFCH transmissions.

At 410, the UE 115-d and the UE 115-e may identify a starting position of the second subset of symbols. In some examples, the starting position of the second subset of symbols may be defined with respect to a quantity of symbols included in the first subset of symbols. For example, the second subset of symbols may start at a symbol after the first subset of symbols. The quantity of symbols included in the first set of symbols may be based on one or more of a carrier frequency of a receiving UE (e.g., the UE 115-e), a symbol length of the wireless channel, an SCS of the wireless channel, or a capability of the receiving UE. In one example, the quantity of symbols included in the first subset of symbols is greater than or equal to two when the carrier frequency is above a threshold, the SCS is above a threshold, or if the capability of the receiving UE is a low. In a second mode of operation (e.g., autonomous sidelink scheduling), the quantity of symbols included in the first subset of symbols may be set for all sidelink UEs in a group, where the group includes multiple pairs of transmitting UEs and receiving UEs. In a first mode of operation (e.g., base station scheduling), the quantity of symbols included in the first subset of the symbols may be different for each transmitting UE and receiving UE pair and may be based on the capability of the receiving UE. The capability of the receiving UE (e.g., the UE 115-e) may be indicated to the transmitting UE (e.g., the UE 115-d) via the control signaling received from the base station at 405.

In some examples, the first subset of the set of symbols may include a repetition of one or more symbols of the second subset of symbols. For example, the first subset of symbols may include a repetition of a starting symbols or an ending symbol of the second subset of symbols. The first subset of symbols may be duplicates of one another or may be different from one another. In some examples, the set of symbols may include a third subset of symbols, where the third subset of symbols is allocated for reference signaling. In such example, first subset of symbols may include a repetition of the third subset of symbols. Additionally, the UE 115-d and the UE 115-e may generate or identify a scrambling seed for each respective symbol of the third subset of symbols. In some examples, the scrambling seed may be the same for all of the symbols of the first subset of symbols. In another example, the scrambling seed may be different for each symbol of the first subset of symbols. In such example, the UE 115-d and the UE 115-e may generate the respective scrambling seed for each symbol of the first subset of symbols using an index associated with each respective symbol.

At 415, the UE 115-e may monitor the set of symbols. In some examples, the UE 115-e may receive signaling over the first subset of symbols and adjust a gain of the receiver at the UE 115-e based on the signaling. The UE 115-e may increase the gain (e.g., in the case of overflow) or decrease the gain (e.g., in the case of underflow).

At 420, the UE 115-d may have pending data to transmit to the UE 115-e and transmit a sidelink transmission including the pending data to the UE 115-e. The UE 115-e may receive the sidelink transmission according to the adjusted gain.

Figure 5:
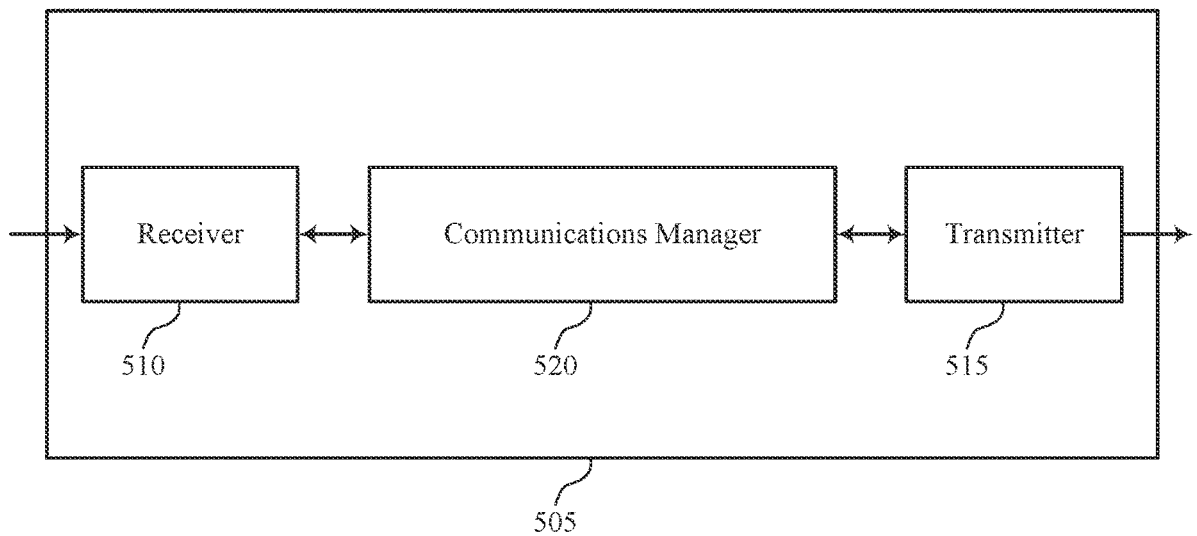
FIGS. 5 and 6 show block diagrams of devices that support enhanced AGC for sidelink communication in accordance with aspects of the present disclosure.

FIG. 5 shows a block diagram 500 of a device 505 that supports enhanced AGC for sidelink communication in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to enhanced AGC for sidelink communication). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to enhanced AGC for sidelink communication). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of enhanced AGC for sidelink communication as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. For example, the communications manager 520 may be configured as or otherwise support a means for monitoring a set of multiple symbols over a wireless channel, the set of multiple symbols including at least a first subset of the set of multiple symbols and a second subset of the set of multiple symbols, where the first subset of the set of multiple symbols includes a quantity of symbols, and where the quantity of symbols is based on one or more of a carrier frequency of the wireless channel, a symbol length of the wireless channel, a SCS of the wireless channel, or a capability of the first UE. The communications manager 520 may be configured as or otherwise support a means for receiving a sidelink transmission over the second subset of the set of multiple symbols in accordance with the monitoring, where a starting position of the second subset of the set of multiple symbols is based on the quantity of symbols including the first subset of the set of multiple symbols.

Additionally or alternatively, the communications manager 520 may support wireless communication at a second UE in accordance with examples as disclosed herein. For example, the communications manager 520 may be configured as or otherwise support a means for receiving an indication of a set of multiple symbols for sidelink transmissions over a wireless channel, the set of multiple symbols including at least a first subset of the set of multiple symbols and a second subset of the set of multiple symbols, where the first subset of the set of multiple symbols includes a quantity of symbols, and where the quantity of symbols is based on one or more of a carrier frequency of the wireless channel, a symbol length of the wireless channel, a SCS of the wireless channel, or a capability of a first UE. The communications manager 520 may be configured as or otherwise support a means for transmitting, to the first UE, a sidelink transmission over the second subset of the set of multiple symbols, where a starting point of the second subset of the set of multiple symbols is based on the quantity of symbols including the first subset of the set of multiple symbols.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of communication resources. The methods as described herein may allow a device 505 to allocate two or more symbols to AGC as opposed to one symbol as disclosed in other methods. The excess time may allow the device 505 to accurately adjust a receiver gain of the device 505 which may increase the probability of receiving a sidelink transmission while operating at higher frequency ranges resulting in fewer retransmissions.

Figure 6:
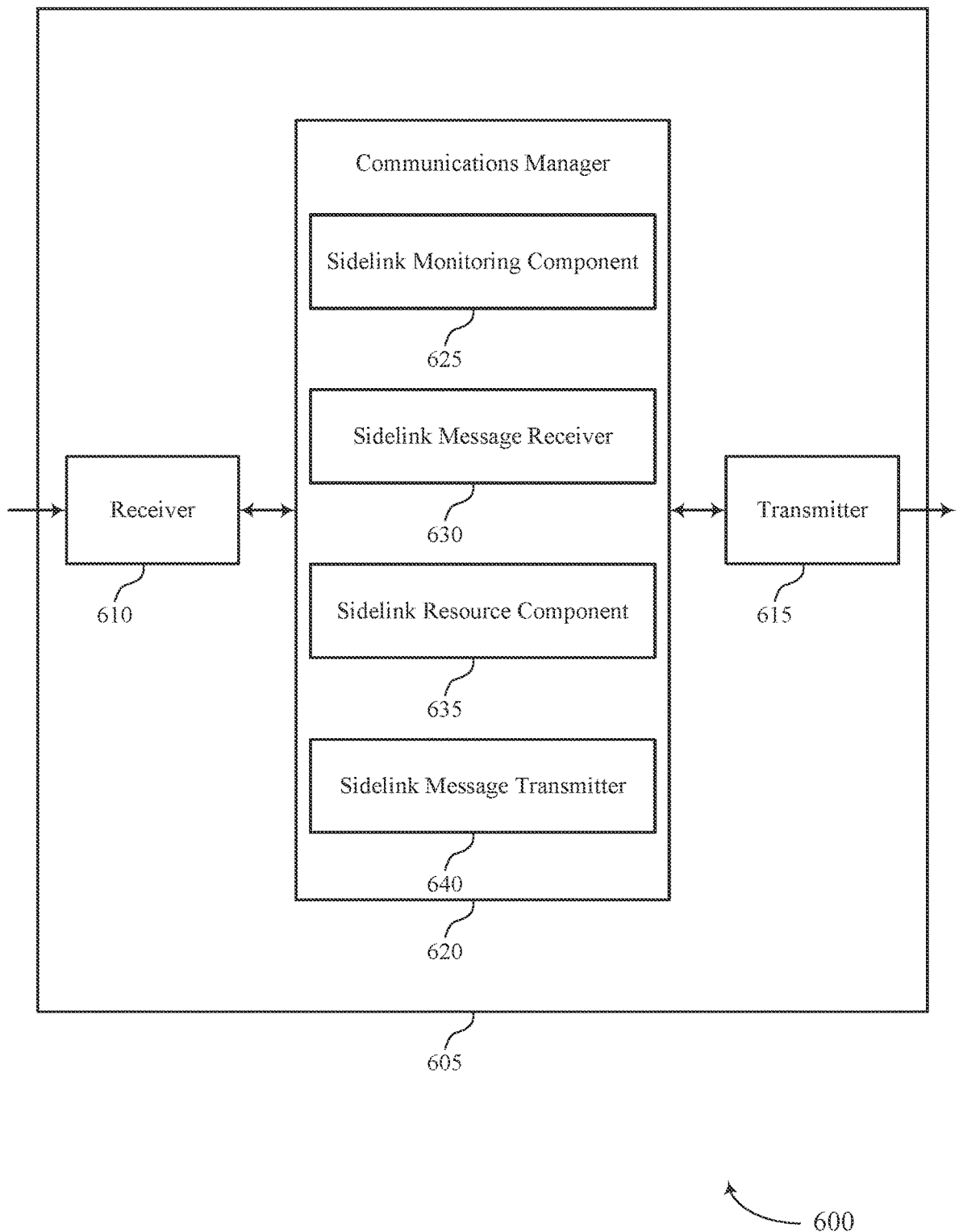

FIG. 6 shows a block diagram 600 of a device 605 that supports enhanced AGC for sidelink communication in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to enhanced AGC for sidelink communication). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to enhanced AGC for sidelink communication). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of enhanced AGC for sidelink communication as described herein. For example, the communications manager 620 may include a sidelink monitoring component 625, a sidelink message receiver 630, a sidelink resource component 635, a sidelink message transmitter 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. The sidelink monitoring component 625 may be configured as or otherwise support a means for monitoring a set of multiple symbols over a wireless channel, the set of multiple symbols including at least a first subset of the set of multiple symbols and a second subset of the set of multiple symbols, where the first subset of the set of multiple symbols includes a quantity of symbols, and where the quantity of symbols is based on one or more of a carrier frequency of the wireless channel, a symbol length of the wireless channel, a SCS of the wireless channel, or a capability of the first UE. The sidelink message receiver 630 may be configured as or otherwise support a means for receiving a sidelink transmission over the second subset of the set of multiple symbols in accordance with the monitoring, where a starting position of the second subset of the set of multiple symbols is based on the quantity of symbols including the first subset of the set of multiple symbols.

Additionally or alternatively, the communications manager 620 may support wireless communication at a second UE in accordance with examples as disclosed herein. The sidelink resource component 635 may be configured as or otherwise support a means for receiving an indication of a set of multiple symbols for sidelink transmissions over a wireless channel, the set of multiple symbols including at least a first subset of the set of multiple symbols and a second subset of the set of multiple symbols, where the first subset of the set of multiple symbols includes a quantity of symbols, and where the quantity of symbols is based on one or more of a carrier frequency of the wireless channel, a symbol length of the wireless channel, a SCS of the wireless channel, or a capability of a first UE. The sidelink message transmitter 640 may be configured as or otherwise support a means for transmitting, to the first UE, a sidelink transmission over the second subset of the set of multiple symbols, where a starting point of the second subset of the set of multiple symbols is based on the quantity of symbols including the first subset of the set of multiple symbols.

Figure 7:
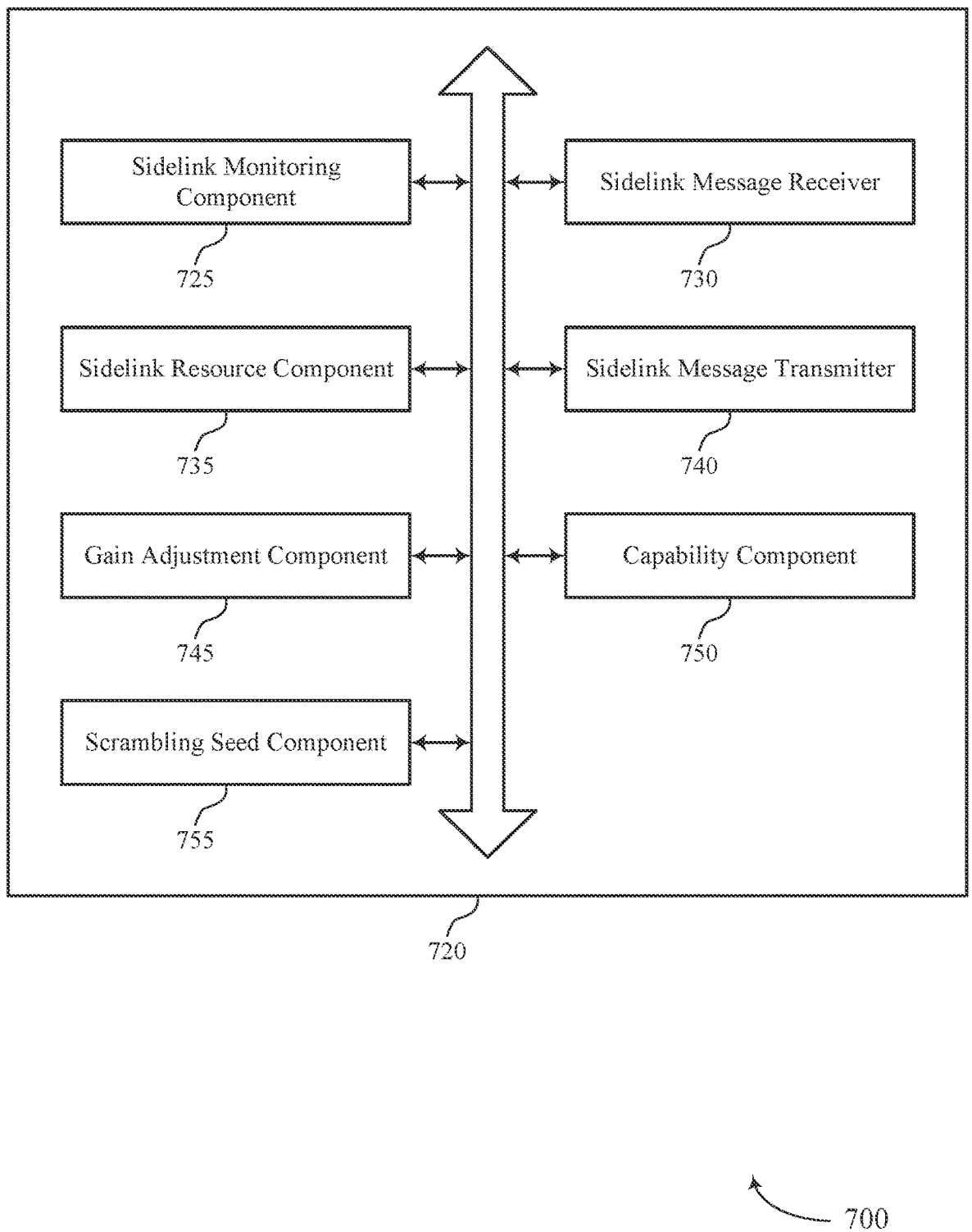
FIG. 7 shows a block diagram of a communications manager that supports enhanced AGC for sidelink communication in accordance with aspects of the present disclosure.

FIG. 7 shows a block diagram 700 of a communications manager 720 that supports enhanced AGC for sidelink communication in accordance with aspects of the present disclosure. The communications manager 720 may be an example of aspects of a communications manager 520, a communications manager 620, or both, as described herein. The communications manager 720, or various components thereof, may be an example of means for performing various aspects of enhanced AGC for sidelink communication as described herein. For example, the communications manager 720 may include a sidelink monitoring component 725, a sidelink message receiver 730, a sidelink resource component 735, a sidelink message transmitter 740, a gain adjustment component 745, a capability component 750, a scrambling seed component 755, or any combination thereof. Each of these components may communicate, directly or indirectly, with one another (e.g., via one or more buses).

The communications manager 720 may support wireless communication at a first UE in accordance with examples as disclosed herein. The sidelink monitoring component 725 may be configured as or otherwise support a means for monitoring a set of multiple symbols over a wireless channel, the set of multiple symbols including at least a first subset of the set of multiple symbols and a second subset of the set of multiple symbols, where the first subset of the set of multiple symbols includes a quantity of symbols, and where the quantity of symbols is based on one or more of a carrier frequency of the wireless channel, a symbol length of the wireless channel, a SCS of the wireless channel, or a capability of the first UE. The sidelink message receiver 730 may be configured as or otherwise support a means for receiving a sidelink transmission over the second subset of the set of multiple symbols in accordance with the monitoring, where a starting position of the second subset of the set of multiple symbols is based on the quantity of symbols including the first subset of the set of multiple symbols.

In some examples, the first subset of the set of multiple symbols includes a repetition of a symbol of the second subset of the set of multiple symbols. In some examples, the first subset of the plurality of symbols includes a starting symbol or an ending symbol of the second subset of the set of multiple symbols.

In some examples, all of the symbols in the first subset of the set of multiple symbols are duplicates of one another. In some examples, the quantity of symbols including the first subset of the set of multiple symbols is greater than or equal to two symbols when the carrier frequency exceeds a threshold. In some examples, the quantity of symbols including the first subset of the set of multiple symbols is greater than or equal to two symbols when the SCS exceeds a threshold.

In some examples, the set of multiple symbols includes a third subset of the set of multiple symbols and at least a portion of resources included in the third subset of the set of multiple symbols are allocated for reference signal transmissions. In some examples, the first subset of the set of multiple symbols includes a repetition of a symbol of the third subset of the set of multiple symbols.

In some examples, the scrambling seed component 755 may be configured as or otherwise support a means for identifying a respective scrambling seed for each respective symbol of the first subset of the set of multiple symbols, where the respective scrambling seed is based on an index corresponding to the respective symbol.

In some examples, the scrambling seed component 755 may be configured as or otherwise support a means for identifying a same scrambling seed for each respective symbol of the first subset of the set of multiple symbols.

In some examples, the second subset of the set of multiple symbols includes resources allocated for one or more of a PSSCH, a PSCCH, or a PSFCH.

In some examples, the gain adjustment component 745 may be configured as or otherwise support a means for estimating an amount of energy of a signal received over the first subset of the plurality of symbols based on monitoring the first subset of the plurality of symbols and adjusting a receiver gain for receiving the sidelink transmission based on estimating the amount of energy.

Additionally or alternatively, the communications manager 720 may support wireless communication at a second UE in accordance with examples as disclosed herein. The sidelink resource component 735 may be configured as or otherwise support a means for receiving an indication of a set of multiple symbols for sidelink transmissions over a wireless channel, the set of multiple symbols including at least a first subset of the set of multiple symbols and a second subset of the set of multiple symbols, where the first subset of the set of multiple symbols includes a quantity of symbols, and where the quantity of symbols is based on one or more of a carrier frequency of the wireless channel, a symbol length of the wireless channel, a SCS of the wireless channel, or a capability of a first UE. The sidelink message transmitter 740 may be configured as or otherwise support a means for transmitting, to the first UE, a sidelink transmission over the second subset of the set of multiple symbols, where a starting point of the second subset of the set of multiple symbols is based on the quantity of symbols including the first subset of the set of multiple symbols.

In some examples, the first subset of the set of multiple symbols includes a repetition of a symbol of the second subset of the set of multiple symbols. In some examples, the first subset of the plurality of symbols includes a starting symbol or an ending symbol of the second subset of the set of multiple symbols.

In some examples, all of the symbols in the first subset of the set of multiple symbols are duplicates of one another. In some examples, the quantity of symbols including the first subset of the set of multiple symbols is greater than or equal to two symbols when the carrier frequency exceeds a threshold. In some examples, the quantity of symbols including the first subset of the set of multiple symbols is greater than or equal to two symbols when the SCS exceeds a threshold.

In some examples, the capability component 750 may be configured as or otherwise support a means for receiving, from a base station, an indication of the capability of the first UE, where receiving the indication of the set of multiple symbols is based on receiving the indication of the capability of the first UE.

In some examples, the set of multiple symbols further includes a third subset of the set of multiple symbols and at least a portion of resources including the third subset of the set of multiple symbols are allocated for reference signal transmissions. In some examples, the first subset of the set of multiple symbols includes a repetition of a symbol of the third subset of the set of multiple symbols.

In some examples, the scrambling seed component 755 may be configured as or otherwise support a means for generating a respective scrambling seed for each respective symbol of the first subset of the set of multiple symbols, where the respective scrambling seed is based on an index corresponding to the respective symbol.

In some examples, the scrambling seed component 755 may be configured as or otherwise support a means for generating a same scrambling seed for each respective symbol of the first subset of the set of multiple symbols. In some examples, the second subset of the set of multiple symbols includes resources allocated for one or more of a PSSCH, a PSCCH, or a PSFCH.

Figure 8:
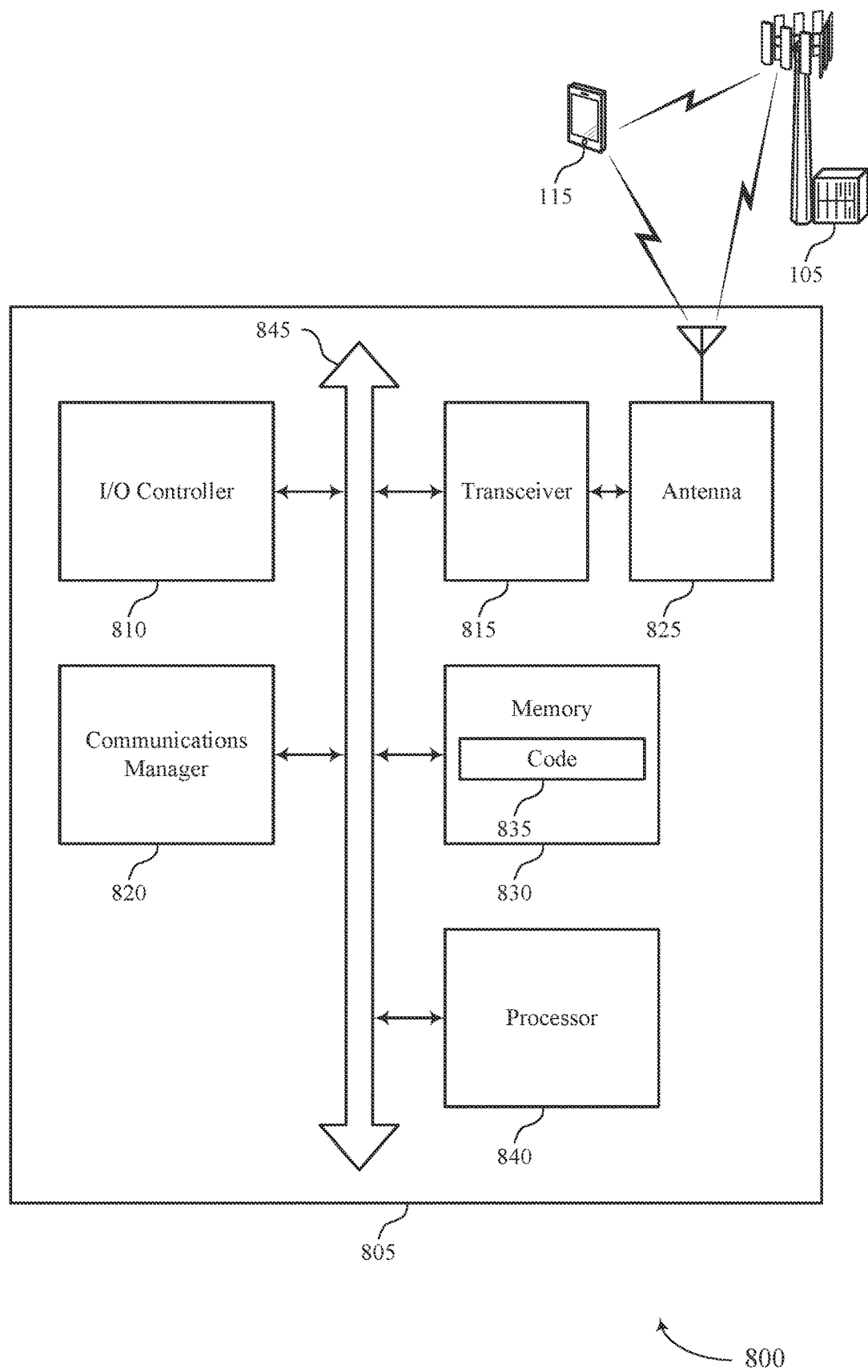
FIG. 8 shows a diagram of a system including a device that supports enhanced AGC for sidelink communication in accordance with aspects of the present disclosure.

FIG. 8 shows a diagram of a system 800 including a device 805 that supports enhanced AGC for sidelink communication in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting enhanced AGC for sidelink communication). For example, the device 805 or a component of the device 805 may include a processor 840 and memory 830 coupled with or to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for monitoring a set of multiple symbols over a wireless channel, the set of multiple symbols including at least a first subset of the set of multiple symbols and a second subset of the set of multiple symbols, where the first subset of the set of multiple symbols includes a quantity of symbols, and where the quantity symbols is based on one or more of a carrier frequency of the wireless channel, a symbol length of the wireless channel, a SCS of the wireless channel, or a capability of the first UE. The communications manager 820 may be configured as or otherwise support a means for receiving a sidelink transmission over the second subset of the set of multiple symbols in accordance with the monitoring, where a starting position of the second subset of the set of multiple symbols is based on the quantity of symbols including the first subset of the set of multiple symbols.

Additionally or alternatively, the communications manager 820 may support wireless communication at a second UE in accordance with examples as disclosed herein. For example, the communications manager 820 may be configured as or otherwise support a means for receiving an indication of a set of multiple symbols for sidelink transmissions over a wireless channel, the set of multiple symbols including at least a first subset of the set of multiple symbols and a second subset of the set of multiple symbols, where the first subset of the set of multiple symbols includes a quantity of symbols, and where the quantity of symbols is based on one or more of a carrier frequency of the wireless channel, a symbol length of the wireless channel, a SCS of the wireless channel, or a capability of a first UE. The communications manager 820 may be configured as or otherwise support a means for transmitting, to the first UE, a sidelink transmission over the second subset of the set of multiple symbols, where a starting point of the second subset of the set of multiple symbols is based on the quantity of symbols including the first subset of the set of multiple symbols.

By including or configuring the communications manager 820 in accordance with examples as described herein, the device 805 may support techniques for improved communication reliability, reduced latency, and more efficient utilization of communication resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of enhanced AGC for sidelink communication as described herein, or the processor 840 and the memory 830 may be otherwise configured to perform or support such operations.

Figure 9:
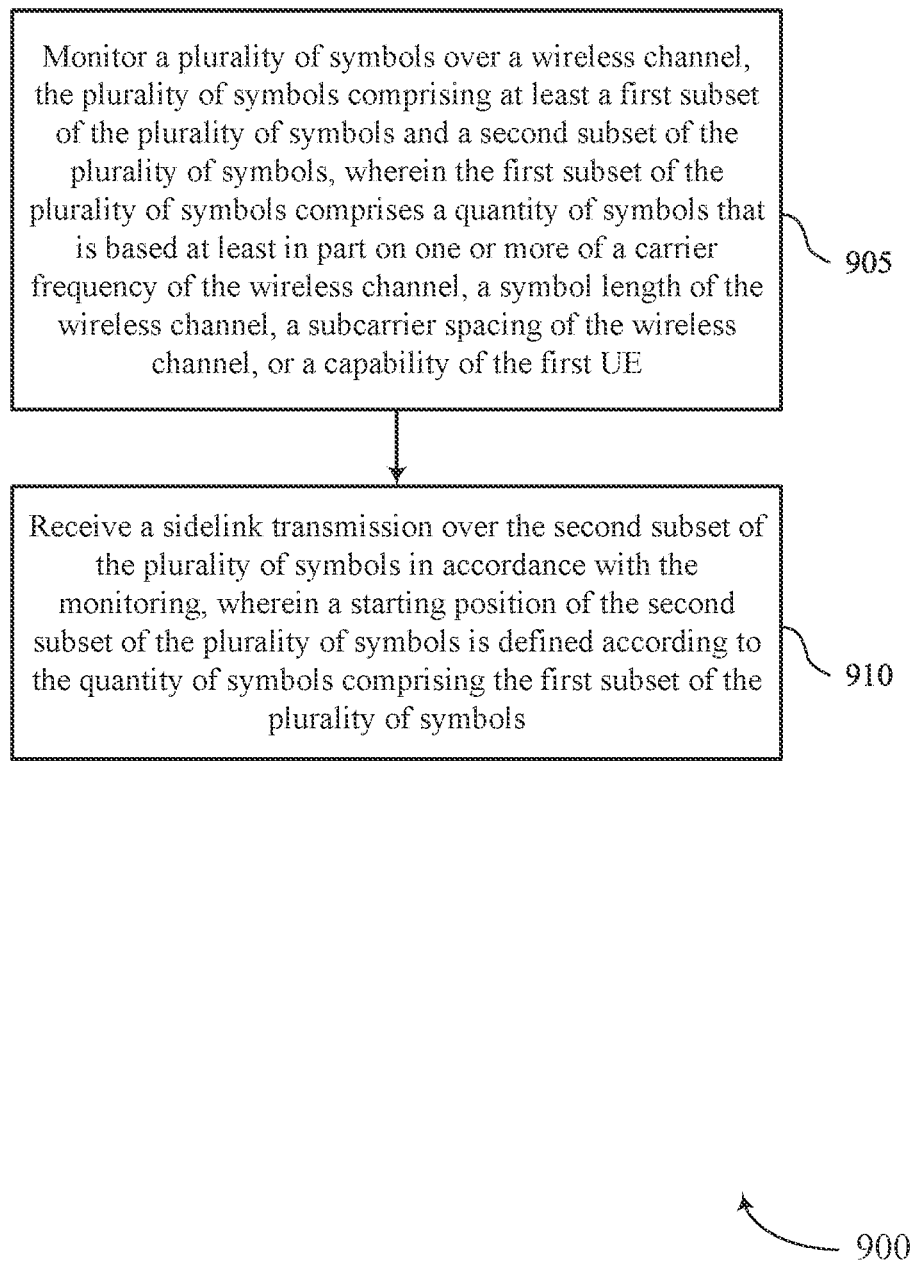
FIGS. 9 through 12 show flowcharts illustrating methods that support enhanced AGC for sidelink communication in accordance with aspects of the present disclosure.

FIG. 9 shows a flowchart illustrating a method 900 that supports enhanced AGC for sidelink communication in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include monitoring a set of multiple symbols over a wireless channel, the set of multiple symbols including at least a first subset of the set of multiple symbols and a second subset of the set of multiple symbols, where the first subset of the set of multiple symbols includes a quantity of symbols, and the quantity of symbols is based on one or more of a carrier frequency of the wireless channel, a symbol length of the wireless channel, a SCS of the wireless channel, or a capability of the first UE. The operations of 905 may be performed in accordance with examples as disclosed herein. In some examples, aspects of the operations of 905 may be performed by a sidelink monitoring component 725 as described with reference to FIG. 7.

At 910, the method may include receiving a sidelink transmission over the second subset of the set of multiple symbols in accordance with the monitoring, where a starting position of the second subset of the set of multiple symbols is based on the quantity of symbols including the first subset of the set of multiple symbols. The operations of 910 may be performed in accordance with examples as disclosed herein. In some examples, aspects of the operations of 910 may be performed by a sidelink message receiver 730 as described with reference to FIG. 7.

Figure 10:
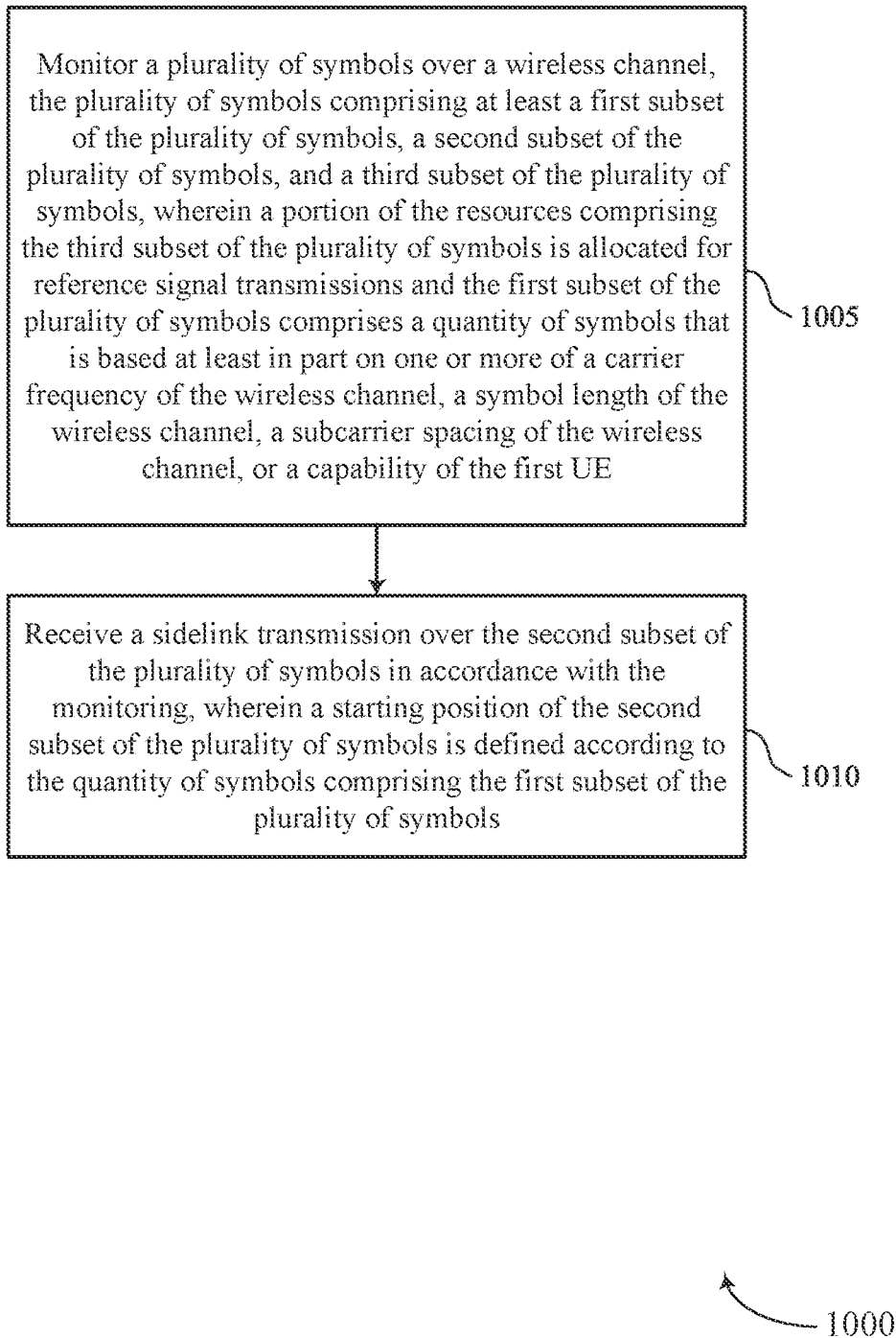

FIG. 10 shows a flowchart illustrating a method 1000 that supports enhanced AGC for sidelink communication in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include monitoring a set of multiple symbols over a wireless channel, the set of multiple symbols including at least a first subset of the set of multiple symbols, a second subset of the set of multiple symbols, and a third subset of the set of multiple symbols, where a portion of the resources included in the third subset of the multiple symbols are allocated for reference signal transmissions and the first subset of the set of multiple symbols includes a quantity of symbols, and where the quantity of symbols is based on one or more of a carrier frequency of the wireless channel, a symbol length of the wireless channel, a SCS of the wireless channel, or a capability of the first UE. The operations of 1005 may be performed in accordance with examples as disclosed herein. In some examples, aspects of the operations of 1005 may be performed by a sidelink monitoring component 725 as described with reference to FIG. 7.

At 1010, the method may include receiving a sidelink transmission over the second subset of the set of the multiple symbols in accordance with the monitoring, where a starting position of the second subset of the set of multiple symbols is based on the quantity of symbols included in the first subset of the set of multiple symbols. The operations of 1010 may be performed in accordance with examples as disclosed herein. In some examples, aspects of the operations of 1010 may be performed by a sidelink message receiver 730 as described with reference to FIG. 7.

Figure 11:
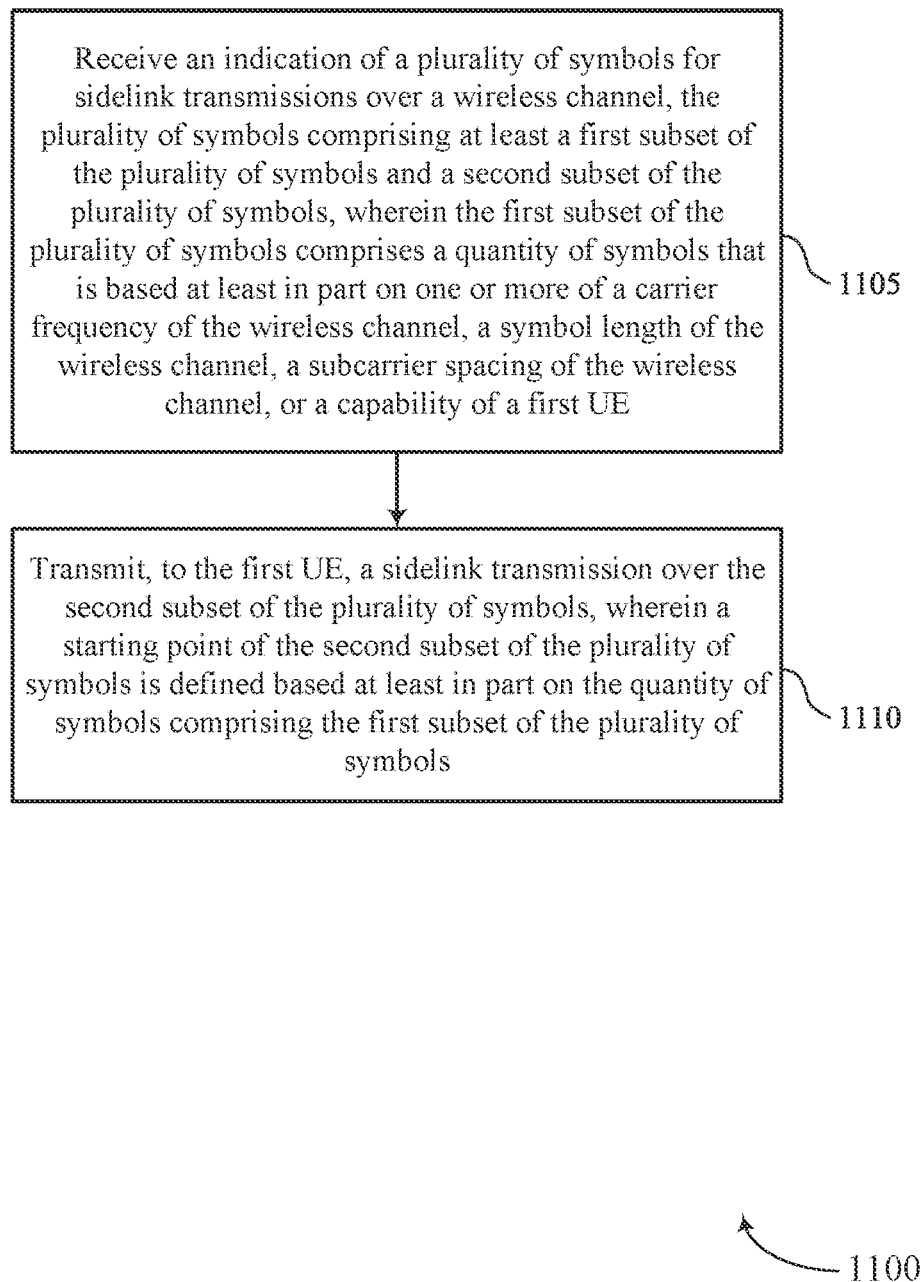

FIG. 11 shows a flowchart illustrating a method 1100 that supports enhanced AGC for sidelink communication in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving an indication of a set of multiple symbols for sidelink transmissions over a wireless channel, the set of multiple symbols including at least a first subset of the set of multiple symbols and a second subset of the set of multiple symbols, where the first subset of the set of multiple symbols includes a quantity of symbols, and where the quantity of symbols is based on one or more of a carrier frequency of the wireless channel, a symbol length of the wireless channel, a SCS of the wireless channel, or a capability of a first UE. The operations of 1105 may be performed in accordance with examples as disclosed herein. In some examples, aspects of the operations of 1105 may be performed by a sidelink resource component 735 as described with reference to FIG. 7.

At 1110, the method may include transmitting, to the first UE, a sidelink transmission over the second subset of the set of multiple symbols, where a starting point of the second subset of the set of multiple symbols is based on the quantity of symbols including the first subset of the set of multiple symbols. The operations of 1110 may be performed in accordance with examples as disclosed herein. In some examples, aspects of the operations of 1110 may be performed by a sidelink message transmitter 740 as described with reference to FIG. 7.

Figure 12:
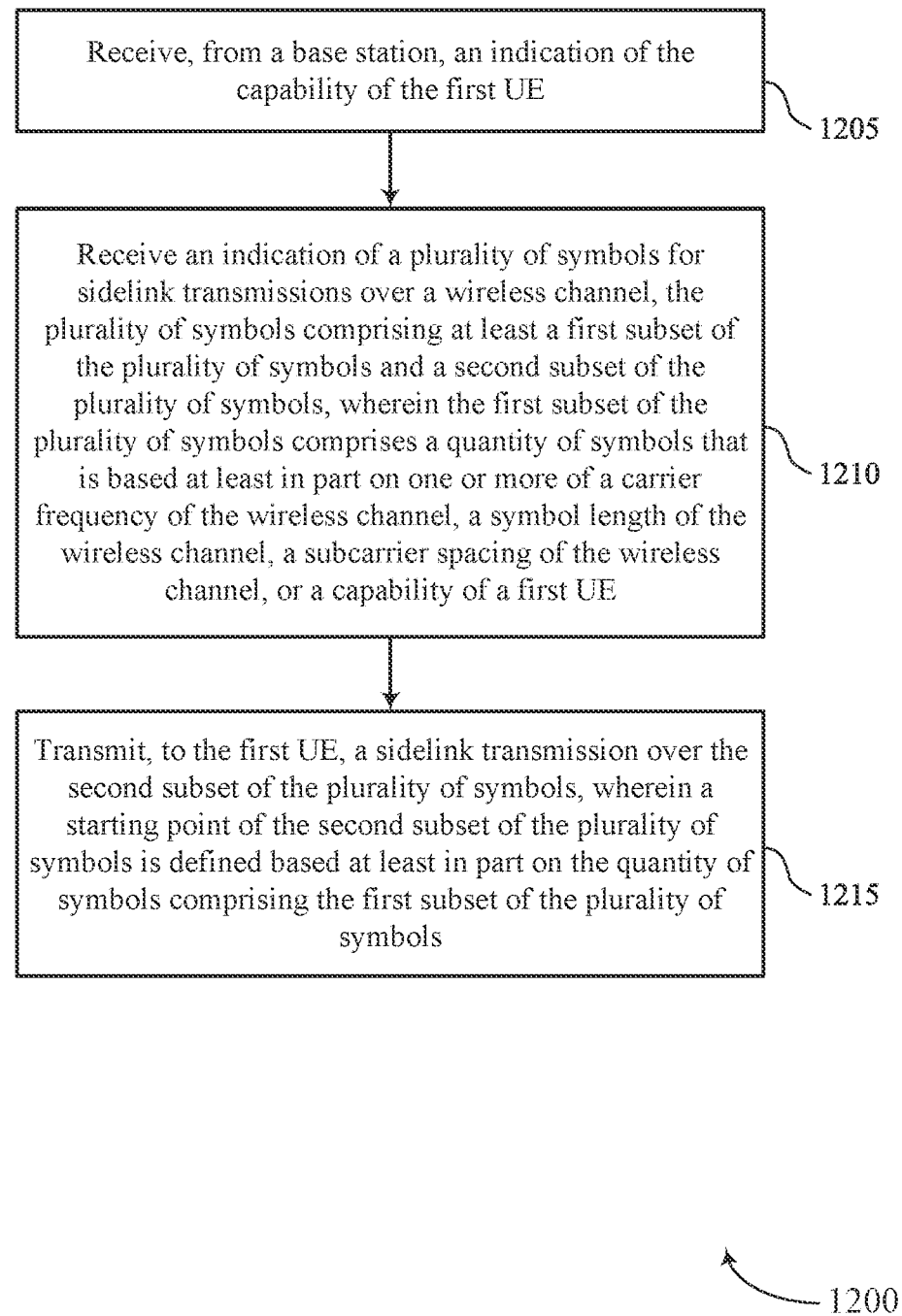

FIG. 12 shows a flowchart illustrating a method 1200 that supports enhanced AGC for sidelink communication in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, an indication of the capability of the first UE. The operations of 1205 may be performed in accordance with examples as disclosed herein. In some examples, aspects of the operations of 1205 may be performed by a capability component 750 as described with reference to FIG. 7.

At 1210, the method may include receiving an indication of a set of multiple symbols for sidelink transmissions over a wireless channel, the set of multiple symbols including at least a first subset of the set of multiple symbols and a second subset of the set of multiple symbols, where the first subset of the set of multiple symbols includes a quantity of symbols, and where the quantity of symbols is based on one or more of a carrier frequency of the wireless channel, a symbol length of the wireless channel, a SCS of the wireless channel, or a capability of a first UE. The operations of 1210 may be performed in accordance with examples as disclosed herein. In some examples, aspects of the operations of 1210 may be performed by a sidelink resource component 735 as described with reference to FIG. 7.

At 1215, the method may include transmitting, to the first UE, a sidelink transmission over the second subset of the set of multiple symbols, where a starting point of the second subset of the set of multiple symbols is based on the quantity of symbols including the first subset of the set of multiple symbols. The operations of 1215 may be performed in accordance with examples as disclosed herein. In some examples, aspects of the operations of 1215 may be performed by a sidelink message transmitter 740 as described with reference to FIG. 7.

The following provides an overview of aspects of the present disclosure:

Aspect 1: A method for wireless communication at a first UE, comprising: monitoring a plurality of symbols over a wireless channel, the plurality of symbols comprising at least a first subset of the plurality of symbols and a second subset of the plurality of symbols, wherein the first subset of the plurality of symbols comprises a quantity of symbols, and wherein the quantity of symbols is based at least in part on one or more of a carrier frequency of the wireless channel, a symbol length of the wireless channel, a SCS of the wireless channel, or a capability of the first UE; and receiving a sidelink transmission over the second subset of the plurality of symbols in accordance with the monitoring, wherein a starting position of the second subset of the plurality of symbols is based at least in part on the quantity of symbols comprising the first subset of the plurality of symbols.

Aspect 2: The method of aspect 1, wherein the first subset of the plurality of symbols comprises a repetition of a symbol of the second subset of the plurality of symbols.

Aspect 3: The method of aspect 2, wherein the first subset of the plurality of symbols comprises a starting symbol or an ending symbol of the second subset of the plurality of symbols.

Aspect 4: The method of any of aspects 1 through 3, wherein all of the symbols in the first subset of the plurality of symbols are duplicates of one another.

Aspect 5: The method of any of aspects 1 through 4, wherein the quantity of symbols comprising the first subset of the plurality of symbols is greater than or equal to two symbols when the carrier frequency exceeds a threshold.

Aspect 6: The method of any of aspects 1 through 5, wherein the quantity of symbols comprising the first subset of the plurality of symbols is greater than or equal to two symbols when the subcarrier spacing exceeds a threshold.

Aspect 7: The method of any of aspects 1 through 6, wherein the plurality of symbols further comprises a third subset of the plurality of symbols and at least a portion of resources comprising the third subset of the plurality of symbols are allocated for reference signal transmissions.

Aspect 8: The method of aspect 7, wherein the first subset of the plurality of symbols comprises a repetition of a symbol of the third subset of the plurality of symbols.

Aspect 9: The method of aspect 8, further comprising: identifying a respective scrambling seed for each respective symbol of the first subset of the plurality of symbols, wherein the respective scrambling seed is based at least in part on an index corresponding to the respective symbol.

Aspect 10: The method of aspect 8, further comprising: identifying a same scrambling seed for each respective symbol of the first subset of the plurality of symbols.

Aspect 11: The method of any of aspects 1 through 10, wherein the second subset of the plurality of symbols comprises resources allocated for one or more of a PSSCH, a PSCCH, or a PSFCH.

Aspect 12: The method of any of aspects 1 through 11, further comprising: estimating an amount of energy of a signal received over the first subset of the plurality of symbols based at least in part on monitoring the first subset of the plurality of symbols and adjusting a receiver gain for receiving the sidelink transmission based at least in part on estimating the amount of energy.

Aspect 13: A method for wireless communication at a second UE, comprising: receiving an indication of a plurality of symbols for sidelink transmissions over a wireless channel, the plurality of symbols comprising at least a first subset of the plurality of symbols and a second subset of the plurality of symbols, wherein the first subset of the plurality of symbols comprises a quantity of symbols, and wherein the quantity of symbols is based at least in part on one or more of a carrier frequency of the wireless channel, a symbol length of the wireless channel, a SCS of the wireless channel, or a capability of a first UE; and transmitting, to the first UE, a sidelink transmission over the second subset of the plurality of symbols, wherein a starting point of the second subset of the plurality of symbols is based at least in part on the quantity of symbols comprising the first subset of the plurality of symbols.

Aspect 14: The method of aspect 13, wherein the first subset of the plurality of symbols comprises a repetition of a symbol of the second subset of the plurality of symbols.

Aspect 15: The method of aspect 14, wherein the first subset of the plurality of symbols comprises a starting symbol or an ending symbol of the second subset of the plurality of symbols.

Aspect 16: The method of any of aspects 13 through 15, wherein all of the symbols in the first subset of the plurality of symbols are duplicates of one another.

Aspect 17: The method of any of aspects 13 through 16, wherein the quantity of symbols comprising the first subset of the plurality of symbols is greater than or equal to two symbols when the carrier frequency exceeds a threshold.

Aspect 18: The method of any of aspects 13 through 17, wherein the quantity of symbols comprising the first subset of the plurality of symbols is greater than or equal to two symbols when the subcarrier spacing exceeds a threshold.

Aspect 19: The method of any of aspects 13 through 18, further comprising: receiving, from a base station, an indication of the capability of the first UE, wherein identifying the plurality of symbols is based at least in part on receiving the indication of the capability of the first UE.

Aspect 20: The method of any of aspects 13 through 19, wherein the plurality of symbols further comprises a third subset of the plurality of symbols and at least a portion of resources comprising the third subset of the plurality of symbols are allocated for reference signal transmissions.

Aspect 21: The method of aspect 20, wherein the first subset of the plurality of symbols comprises a repetition of a symbol of the third subset of the plurality of symbols.

Aspect 22: The method of aspect 21, further comprising: generating a respective scrambling seed for each respective symbol of the first subset of the plurality of symbols, wherein the respective scrambling seed is based at least in part on an index corresponding to the respective symbol.

Aspect 23: The method of aspect 21, further comprising: generating a same scrambling seed for each respective symbol of the first subset of the plurality of symbols.

Aspect 24: The method of any of aspects 13 through 23, wherein the second subset of the plurality of symbols comprises resources allocated for one or more of a PSSCH, a PSCCH, or a PSFCH.

Aspect 25: An apparatus for wireless communication at a first UE, comprising a processor; memory coupled with the processor; and instructions stored in the memory and executable by the processor to cause the apparatus to perform a method of any of aspects 1 through 12.

Aspect 26: An apparatus for wireless communication at a first UE, comprising at least one means for performing a method of any of aspects 1 through 12.

Aspect 27: A non-transitory computer-readable medium storing code for wireless communication at a first UE, the code comprising instructions executable by a processor to perform a method of any of aspects 1 through 12.

Aspect 28: An apparatus for wireless communication at a second UE, comprising a processor; memory coupled with the processor; and instructions stored in the memory and executable by the processor to cause the apparatus to perform a method of any of aspects 13 through 24.

Aspect 29: An apparatus for wireless communication at a second UE, comprising at least one means for performing a method of any of aspects 13 through 24.

Aspect 30: A non-transitory computer-readable medium storing code for wireless communication at a second UE, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
   at least one processor;
   at least one memory coupled with the at least one processor and storing instructions executable by the at least one processor to cause the apparatus to:
      monitor a plurality of symbols over a wireless channel, the plurality of symbols comprising at least a first subset of the plurality of symbols and a second subset of the plurality of symbols, wherein the first subset of the plurality of symbols comprises a quantity of symbols, and wherein the quantity of symbols is based at least in part on one or more of a carrier frequency of the wireless channel, a symbol length of the wireless channel, a subcarrier spacing of the wireless channel, or a capability of the first UE, and wherein at least one symbol of the first subset of the plurality of symbols comprises a repetition of a symbol of the second subset of the plurality of symbols; and
      receive a sidelink transmission over the second subset of the plurality of symbols in accordance with the monitoring, wherein a starting position of the second subset of the plurality of symbols is based at least in part on the quantity of symbols comprising the first subset of the plurality of symbols.

2. The apparatus of claim 1, wherein the first subset of the plurality of symbols comprises a starting symbol or an ending symbol of the second subset of the plurality of symbols.

3. The apparatus of claim 1, wherein all of the symbols in the first subset of the plurality of symbols are duplicates of one another.

4. The apparatus of claim 1, wherein the quantity of symbols comprising the first subset of the plurality of symbols is greater than or equal to two symbols when the carrier frequency exceeds a threshold.

5. The apparatus of claim 1, wherein the quantity of symbols comprising the first subset of the plurality of symbols is greater than or equal to two symbols when the subcarrier spacing exceeds a threshold.

6. The apparatus of claim 1, wherein the plurality of symbols further comprises a third subset of the plurality of symbols and at least a portion of resources comprising the third subset of the plurality of symbols are allocated for reference signal transmissions.

7. The apparatus of claim 6, wherein the first subset of the plurality of symbols comprises a repetition of a symbol of the third subset of the plurality of symbols.

8. The apparatus of claim 7, wherein the instructions are further executable by the at least one processor to cause the apparatus to:
identify a respective scrambling seed for each respective symbol of the first subset of the plurality of symbols, wherein the respective scrambling seed is based at least in part on an index corresponding to the respective symbol.

9. The apparatus of claim 7, wherein the instructions are further executable by the at least one processor to cause the apparatus to:
identify a same scrambling seed for each respective symbol of the first subset of the plurality of symbols.

10. The apparatus of claim 1, wherein the second subset of the plurality of symbols comprises resources allocated for one or more of a physical sidelink shared channel, a physical sidelink control channel, or a physical sidelink feedback channel.

11. The apparatus of claim 1, wherein the instructions are further executable by the at least one processor to cause the apparatus to:
estimate an amount of energy of a signal received over the first subset of the plurality of symbols based at least in part on monitoring the first subset of the plurality of symbols; and
adjust a receiver gain for receiving the sidelink transmission based at least in part on estimating the amount of energy.

12. An apparatus for wireless communication at a second user equipment (UE), comprising:
at least one processor;
at least one memory coupled with the at least one processor and storing instructions and executable by the at least one processor to cause the apparatus to:
receive an indication of a plurality of symbols for sidelink transmissions over a wireless channel, the plurality of symbols comprising at least a first subset of the plurality of symbols and a second subset of the plurality of symbols, wherein the first subset of the plurality of symbols comprises a quantity of symbols, and wherein the quantity of symbols is based at least in part on one or more of a carrier frequency of the wireless channel, a symbol length of the wireless channel, a subcarrier spacing of the wireless channel, or a capability of a first UE, and wherein at least one symbol of the first subset of the plurality of symbols comprises a repetition of a symbol of the second subset of the plurality of symbols; and
transmit, to the first UE, a sidelink transmission over the second subset of the plurality of symbols, wherein a starting point of the second subset of the plurality of symbols is based at least in part on the quantity of symbols comprising the first subset of the plurality of symbols.

13. The apparatus of claim 12, wherein the first subset of the plurality of symbols comprises a starting symbol or an ending symbol of the second subset of the plurality of symbols.

14. The apparatus of claim 12, wherein all of the symbols in the first subset of the plurality of symbols are duplicates of one another.

15. The apparatus of claim 12, wherein the quantity of symbols comprising the first subset of the plurality of symbols is greater than or equal to two symbols when the carrier frequency exceeds a threshold.

16. The apparatus of claim 12, wherein the quantity of symbols comprising the first subset of the plurality of symbols is greater than or equal to two symbols when the subcarrier spacing exceeds a threshold.

17. The apparatus of claim 12, wherein the instructions are further executable by the at least one processor to cause the apparatus to:
receive, from a base station, an indication of the capability of the first UE, wherein receiving the indication of the plurality of symbols is based at least in part on receiving the indication of the capability of the first UE.

18. The apparatus of claim 12, wherein the plurality of symbols further comprises a third subset of the plurality of symbols and at least a portion of resources comprising the third subset of the plurality of symbols are allocated for reference signal transmissions.

19. The apparatus of claim 18, wherein the first subset of the plurality of symbols comprises a repetition of a symbol of the third subset of the plurality of symbols.

20. The apparatus of claim 19, wherein the instructions are further executable by the at least one processor to cause the apparatus to:
generate a respective scrambling seed for each respective symbol of the first subset of the plurality of symbols, wherein the respective scrambling seed is based at least in part on an index corresponding to the respective symbol.

21. The apparatus of claim 19, wherein the instructions are further executable by the at least one processor to cause the apparatus to:
generate a same scrambling seed for each respective symbol of the first subset of the plurality of symbols.

22. The apparatus of claim 12, wherein the second subset of the plurality of symbols comprises resources allocated for one or more of a physical sidelink shared channel, a physical sidelink control channel, or a physical sidelink feedback channel.

23. A method for wireless communication at a first user equipment (UE), comprising:
monitoring a plurality of symbols over a wireless channel, the plurality of symbols comprising at least a first subset of the plurality of symbols and a second subset of the plurality of symbols, wherein the first subset of the plurality of symbols comprises a quantity of symbols, and wherein the quantity of symbols based at least in part on one or more of a carrier frequency of the wireless channel, a symbol length of the wireless channel, a subcarrier spacing of the wireless channel, or a capability of the first UE, and wherein at least one symbol of the first subset of the plurality of symbols comprises a repetition of a symbol of the second subset of the plurality of symbols; and receiving a sidelink transmission over the second subset of the plurality of symbols in accordance with the monitoring, wherein a starting position of the second subset of the plurality of symbols is based at least in part on the quantity of symbols comprising the first subset of the plurality of symbols.

24. The method of claim 23, wherein the first subset of the plurality of symbols comprises a starting symbol or an ending symbol of the second subset of the plurality of symbols.

25. A method for wireless communication at a second user equipment (UE), comprising:
receiving an indication of a plurality of symbols for sidelink transmissions over a wireless channel, the plurality of symbols comprising at least a first subset of the plurality of symbols and a second subset of the plurality of symbols, wherein the first subset of the plurality of symbols comprises a quantity of symbols, and wherein the quantity of symbols based at least in part on one or more of a carrier frequency of the wireless channel, a symbol length of the wireless channel, a subcarrier spacing of the wireless channel, or a capability of a first UE, and wherein at least one symbol of the first subset of the plurality of symbols comprises a repetition of a symbol of the second subset of the plurality of symbols; and
transmitting, to the first UE, a sidelink transmission over the second subset of the plurality of symbols, wherein a starting point of the second subset of the plurality of symbols is based at least in part on the quantity of symbols comprising the first subset of the plurality of symbols.

26. The method of claim 25, wherein the first subset of the plurality of symbols comprises a starting symbol or an ending symbol of the second subset of the plurality of symbols.

27. The method of claim 23, wherein the plurality of symbols further comprises a third subset of the plurality of symbols and at least a portion of resources comprising the third subset of the plurality of symbols are allocated for reference signal transmissions, and wherein the first subset of the plurality of symbols comprises a repetition of a symbol of the third subset of the plurality of symbols.

28. The method of claim 27, further comprising:
identifying a respective scrambling seed for each respective symbol of the first subset of the plurality of symbols, wherein the respective scrambling seed is based at least in part on an index corresponding to the respective symbol.

29. The method of claim 25, wherein the first subset of the plurality of symbols comprises a repetition of a symbol of the third subset of the plurality of symbols.

30. The method of claim 29, further comprising:
generating a respective scrambling seed for each respective symbol of the first subset of the plurality of symbols, wherein the respective scrambling seed is based at least in part on an index corresponding to the respective symbol.

* * * * *